US012535854B2

(12) United States Patent
Lee et al.

(10) Patent No.: US 12,535,854 B2
(45) Date of Patent: Jan. 27, 2026

(54) WEARABLE DEVICE AND METHOD FOR IDENTIFYING WEARING STATE OF OTHER WEARABLE DEVICE

(71) Applicant: SAMSUNG ELECTRONICS CO., LTD., Suwon-si (KR)

(72) Inventors: Seungwon Lee, Suwon-si (KR); Hyunsu Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/732,788

(22) Filed: Jun. 4, 2024

(65) Prior Publication Data
US 2025/0085743 A1   Mar. 13, 2025

Related U.S. Application Data

(63) Continuation of application No. PCT/KR2024/007107, filed on May 24, 2024.

(30) Foreign Application Priority Data

Sep. 12, 2023  (KR) .................. 10-2023-0121414
Oct. 23, 2023  (KR) .................. 10-2023-0142499

(51) Int. Cl.
G06F 1/16 (2006.01)
G06F 3/01 (2006.01)

(52) U.S. Cl.
CPC .............. *G06F 1/163* (2013.01); *G06F 3/011* (2013.01)

(58) Field of Classification Search
CPC ........ G06F 1/163; G06F 1/1694; G06F 3/015; G06F 3/0346; G06F 3/048–04897;
(Continued)

(56) References Cited

U.S. PATENT DOCUMENTS 9,310,887 B2   4/2016  Wieder
9,880,620 B2   1/2018  Kienzle et al.
(Continued)

FOREIGN PATENT DOCUMENTS

JP           6692821 B2    5/2020
KR     20160051947 A      5/2016
(Continued)

OTHER PUBLICATIONS

International Search Report and Written Opinion for International Application No. PCT/KR2024/007107; International Filing Date May 24, 2024; International Search Report Mail Date Sep. 11, 2024; 9 Pages.

Primary Examiner — Amr A Awad
Assistant Examiner — Aaron Midkiff
(74) Attorney, Agent, or Firm — CANTOR COLBURN LLP

(57) ABSTRACT

According to an embodiment, a first wearable device includes at least one sensor, a communication circuit, and a processor operably coupled to the at least one sensor and the communication circuit. The processor is configured to obtain, using the at least one sensor, first information on orientation of the first wearable device worn on a first part of a body of a user. The processor is configured to receive, from a second wearable device connected to the first wearable device and worn on a second part of the body of the user, second information on orientation of the second wearable device. Based on the first information and the second information, the processor is configured to provide a notification to guide changing at least one of a position or a direction of the second wearable device on the second part.

16 Claims, 21 Drawing Sheets

(58) Field of Classification Search
CPC ........ G06F 21/44; G06F 21/445; G06F 3/011; G06F 3/014; G06F 1/32–3296; G06F 3/017; G06F 2221/21–2153; A61B 5/00–7495; G08B 21/18; G08B 21/182; G02B 27/00–648; G02B 2027/0105–0198; H04W 4/023; H04W 12/33; G06V 40/60; G06V 40/67
See application file for complete search history.

(56) References Cited

U.S. PATENT DOCUMENTS

| | | | |
|---|---|---|---|
| 9,906,908 | B2 | 2/2018 | Lee et al. |
| 10,103,765 | B2 | 10/2018 | Shim et al. |
| 10,176,894 | B2 | 1/2019 | Park et al. |
| 10,656,604 | B2 | 5/2020 | Godlieb |
| 11,861,065 | B2 | 1/2024 | Mounier et al. |
| 2016/0098091 | A1* | 4/2016 | Hwang ................. G06F 21/606 715/761 |
| 2016/0183869 | A1* | 6/2016 | Oh .......................... A61B 5/681 600/595 |
| 2017/0024008 | A1* | 1/2017 | Kienzle ................... G06F 3/017 |
| 2017/0038849 | A1* | 2/2017 | Hwang ................ G06F 3/04883 |
| 2018/0234415 | A1* | 8/2018 | Fukuda ................. H04W 12/33 |
| 2018/0317770 | A1* | 11/2018 | Ortega ..................... G06F 3/011 |
| 2020/0004291 | A1* | 1/2020 | Wexler ..................... G06F 1/163 |
| 2022/0301041 | A1* | 9/2022 | Lee ......................... G06F 9/453 |
| 2022/0375103 | A1 | 11/2022 | Seisan |
| 2022/0404391 | A1 | 12/2022 | Lee et al. |
| 2022/0413609 | A1 | 12/2022 | Mounier et al. |
| 2023/0099404 | A1* | 3/2023 | Karri ...................... F16M 11/18 345/156 |
| 2023/0325006 | A1 | 10/2023 | Kim et al. |

FOREIGN PATENT DOCUMENTS

| | | |
|---|---|---|
| KR | 20160072438 A | 6/2016 |
| KR | 20170055523 A | 5/2017 |
| KR | 20170127744 A | 11/2017 |
| KR | 102318887 B1 | 10/2021 |
| KR | 20220102436 A | 7/2022 |
| KR | 20240022503 A | 2/2024 |
| WO | 2022131534 A1 | 6/2022 |
| WO | 2022215977 A1 | 10/2022 |
| WO | 2022245856 A1 | 11/2022 |

* cited by examiner

WEARABLE DEVICE AND METHOD FOR IDENTIFYING WEARING STATE OF OTHER WEARABLE DEVICE

CROSS-REFERENCE TO RELATED APPLICATIONS

This application is a continuation of PCT International Application No. PCT/KR2024/007107, which was filed on May 24, 2024, and claims priority to Korean Patent Application No. 10-2023-0142499, filed on Oct. 23, 2023, and claims priority to Korean Patent Application No. 10-2023-0121414, filed on Sep. 12, 2023, in the Korean Intellectual Property Office, the disclosure of which are incorporated by reference herein their entirety.

BACKGROUND

Field

The following descriptions relate to a wearable electronic device and a method for identifying a wearing state of other wearable devices.

Description of Related Art

Various services are provided through a wearable device. The wearable device may operate by being worn on a part of a body of a user. The wearable device may identify biometric information of the user while being worn on the part of the body of the user and provide a service based on biometric information of the user.

The above-described information may be provided as a related art for the purpose of helping understanding of the present disclosure. No argument or decision is made as to whether any of the above description may be applied as a prior art related to the present disclosure.

SUMMARY

According to an embodiment, a first wearable device may include at least one sensor, a communication circuit, and a processor operably coupled to the at least one sensor and the communication circuit. The processor may be configured to obtain, using the at least one sensor, first information on orientation of the first wearable device worn on a first part of a body of a user. The processor may be configured to receive, from a second wearable device connected to the first wearable device and worn on a second part of the body of the user, second information on orientation of the second wearable device. Based on the first information and the second information, the processor may be configured to provide a notification to guide changing at least one of a position or a direction of the second wearable device on the second part.

According to an embodiment, a method of a first wearable device may include obtaining, using at least one sensor of the first wearable device, first information on orientation of the first wearable device worn on a first part of a body of a user. The method may include receiving, from a second wearable device connected to the first wearable device and worn on a second part of the body of the user, second information on orientation of the second wearable device. Based on the first information and the second information, the method may include providing a notification to guide changing at least one of a position or a direction of the second wearable device on the second part.

According to an embodiment, non-transitory computer readable storage medium may store one or more programs. The one or more programs may include instructions which, when being executed by a processor of a first wearable device with at least one sensor and a communication circuit, cause the first wearable device to obtain, using the at least one sensor, first information on orientation of the first wearable device worn on a first part of a body of a user. The one or more programs may include instructions which, when being executed by the processor, cause the first wearable device to receive, from a second wearable device connected to the first wearable device and worn on a second part of the body of the user, second information on orientation of the second wearable device. The one or more programs may include instructions which, when being executed by the processor, cause the first wearable device to provide, based on the first information and the second information, a notification to guide changing at least one of a position or a direction of the second wearable device on the second part.

According to an embodiment, an electronic device may include a communication circuit, and a processor operably coupled to the communication circuit. The processor may be configured to identify that the first wearable device is worn on a first part of a body of a user and that the second wearable device is worn on a second part of the body of the user. Based on the identification, the processor may be configured to identify a designated axis for identifying a first rotation angle of the first wearable device and a second rotation angle of the second wearable device. The processor may be configured to transmit information on the designated axis to the first wearable device and the second wearable device.

DETAILED DESCRIPTION

Figure 1:
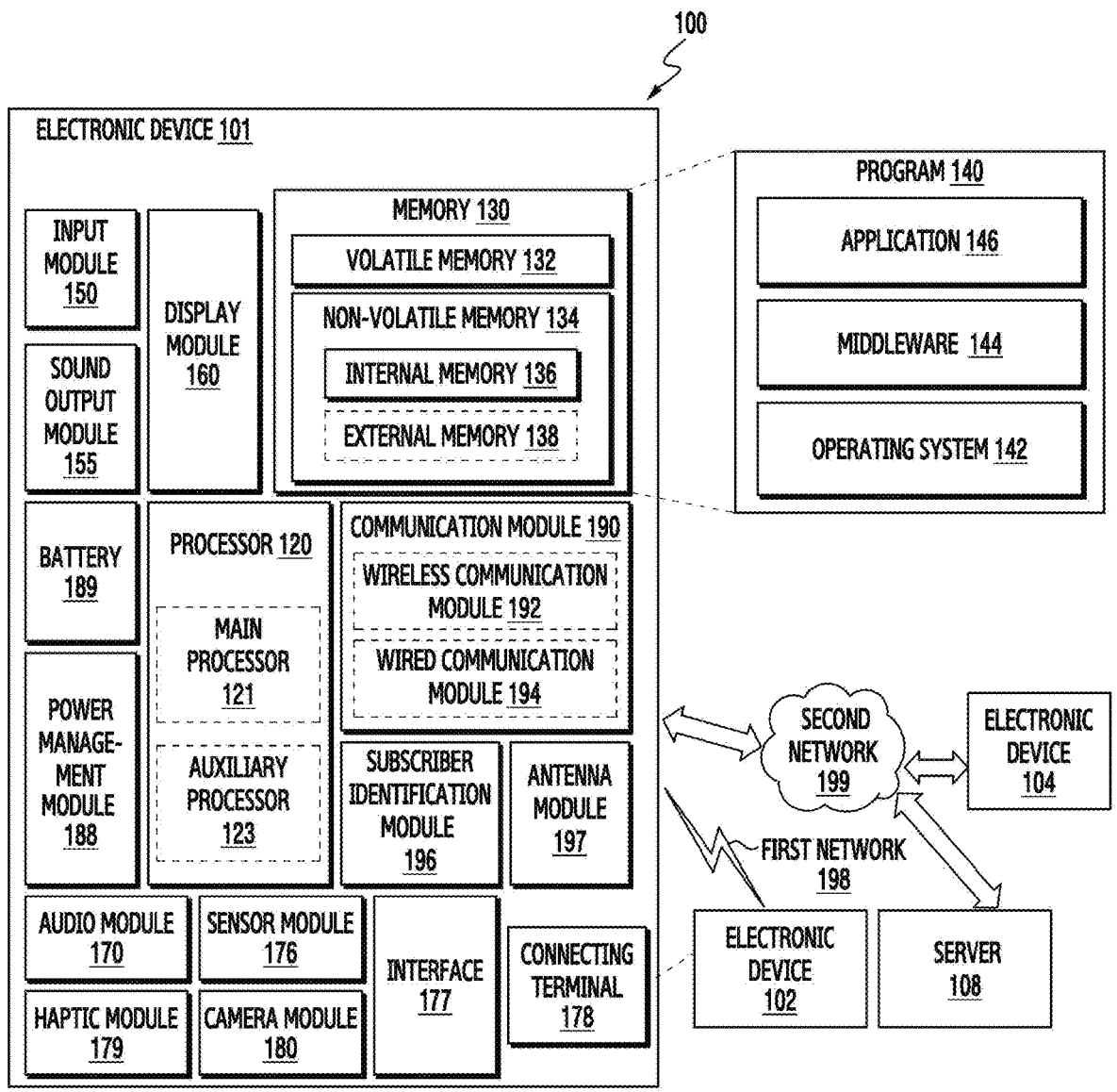
FIG. 1 is a block diagram of an electronic device in a network environment according to an embodiment.

Hereinafter, with reference to the drawings, an embodiment of the present disclosure will be described in detail so that a person skilled in the technical field to which the present disclosure belongs may easily implement it. However, the present disclosure may be implemented in a variety of different forms and is not limited to an embodiment described herein. In relation to the description of the drawings, the same or similar reference numerals may be used for the same or similar component. Also, in a drawing and a related description, a well-known description of function and configuration may be omitted for clarity and brevity.

FIG. 1 is a block diagram of an electronic device in a network environment, according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
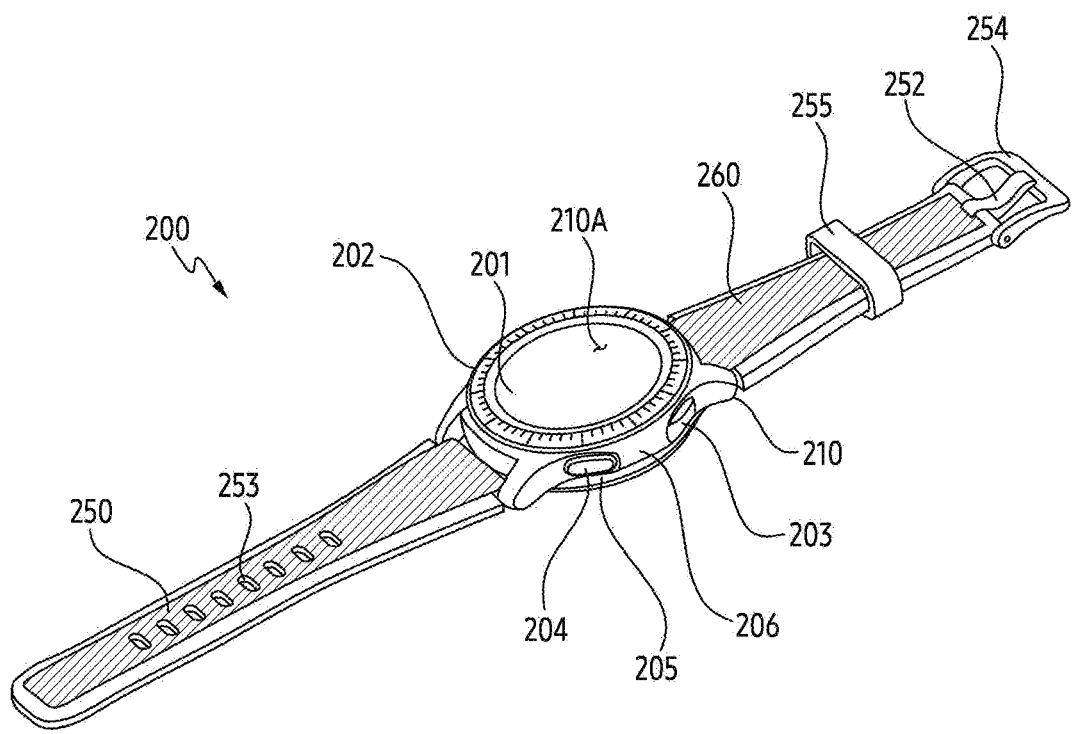
FIGS. 2A and 2B are perspective views of an electronic device according to an embodiment.
Figure 2B:
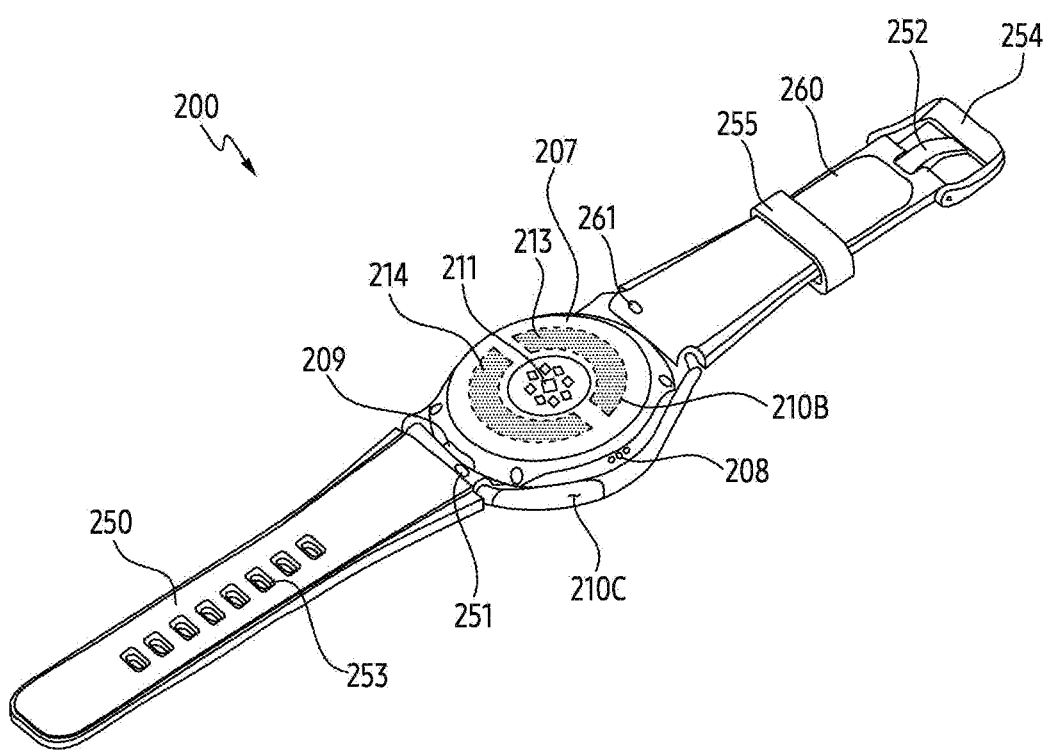

FIGS. 2A and 2B are perspective views of an electronic device according to an embodiment.

Referring to FIGS. 2A and 2B, an electronic device 200 (e.g., the electronic device 101 of FIG. 1) according to an embodiment may include a housing 210 including a first surface (or front surface) 210A, a second surface (or rear surface) 210B, and a side surface 210C surrounding the space between the first surface 210A and the second surface 210B and binding members 250 and 260 connected to at least a part of the housing 210 and configured to detachably attach the electronic device 200 to a part of the user's body (e.g., wrist, ankle, etc.). In another embodiment (not illustrated), the housing may also refer to a structure that forms at least a part of the first surface 210A, the second surface 210B, and the side surface 210C of FIG. 2A. According to an embodiment, at least a part of the first surface 210A may be implemented by a substantially transparent front plate 201 (e.g., glass plate or polymer plate including various coating layers). The second surface 210B may be implemented by a substantially opaque rear plate 207. The rear plate 207 may be made of, for example, coated or colored glass, ceramic, polymer, metal (e.g., aluminum, stainless steel (STS), or magnesium), or a combination of at least two of the materials. The side surface 210C may be coupled to the front plate 201 and the rear plate 207 and may be implemented by a side bezel structure (or "side member") 206 including metal and/or polymer. In some embodiments, the rear plate 207 and the side bezel structure 206 may be integrated together and may include the same material (e.g., metal material such as aluminum). The binding members 250 and 260 may be made of various materials and may be made in various shapes. The binding members 250 and 260 may be made of woven fabric, leather, rubber, urethane, metal, ceramic, or a combination of at least two of the materials.

According to an embodiment, the electronic device 200 may include at least one of a display 220 (see FIG. 3), an audio module 205 and 208, a sensor module 211, a key input device 202, 203 and 204, and a connector hole 209. In some embodiments, the electronic device 200 may omit at least one of the components (e.g., the key input devices 202, 203 and 204, the connector hole 209, or the sensor module 211) or may further include another component.

The display 220 may be exposed, for example, through a substantial portion of the front plate 201. The shape of the display 220 may correspond to the shape of the front plate 201, such as circular (shown in FIG. 2), oval, or polygonal. The display 220 may be coupled to or adjacent to a touch sensing circuit, a pressure sensor capable of measuring the strength (pressure) of touches, and/or a fingerprint sensor.

The audio modules 205 and 208 may include a microphone hole 205 and a speaker hole 208. Corresponding to the microphone hole 205, a microphone for obtaining external sound may be disposed inside, and in some embodiments, a plurality of microphones may be disposed to detect the direction of the sound. The speaker hole 208 may be used with an external speaker and a receiver for phone calls. In some embodiments, the speaker hole 208 and the microphone hole 205 may be implemented as a single hole, a speaker (e.g., piezo speaker) may be included without the speaker hole 208, and/or a speaker may be included with the speaker hole 208.

The sensor module 211 may generate electrical signal(s) or data value(s) corresponding to internal operating state(s) of the electronic device 200 or external environmental state(s). The sensor module 211 may include, for example, a biometric sensor module 211 (e.g., heart-rate monitor (HRM) sensor) disposed on the second surface 210B of the housing 210. The electronic device 200 may further include at least one sensor module not shown, such as a gesture sensor, a gyro sensor, a pressure sensor, a magnetic sensor, an acceleration sensor, a grip sensor, a color sensor, an infrared sensor, a biometric sensor, a humidity sensor, and/or an illumination sensor.

The sensor module 211 may include electrode regions 213 and 214 forming a part of the surface of the electronic device 200 and a bio-signal detection circuit (not shown) electrically connected to the electrode regions 213 and 214. For example, the electrode regions 213 and 214 may include the first electrode region 213 and the second electrode region 214 disposed on the second surface 210B of the housing 210. The sensor module 211 may be configured such that the electrode regions 213 and 214 obtain electrical signal(s) from a part of the user's body, and the bio-signal detection circuit may detect biometric information of the user based on the electrical signal(s).

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key may have a shape corresponding to the shape of the front plate 201. In another embodiment, the electronic device 200 may not include some or all of the above-described key input devices 202, 203, and 204, and the not included key input devices 202, 203, and 204 may be implemented in other forms such as soft keys on the display 220.

The connector hole 209 may accommodate a connector (e.g., USB connector) for transmitting and receiving power and/or data to and from external electronic devices and may include another connector hole (not illustrated) capable of accommodating a connector for transmitting and receiving audio signals to and from an external electronic device. The electronic device 200 may further include, for example, a connector cover (not illustrated) that covers at least a part of the connector hole 209 and blocks the inflow of external foreign material into the connector hole.

The binding members 250 and 260 may be detachably attached to at least a part of the housing 210 using locking members 251, 261. The binding members 250 and 260 may include one or more of a fixing member 252, a fixing member fastening hole 253, a band guide member 254, and a band fixing ring 255.

The fixing member 252 may be configured to fix the housing 210 and the binding members 250 and 260 to a part of the user's body (e.g., wrist, ankle, etc.). The fixing member fastening hole 253 may correspond to the fixing member 252 to fix the housing 210 and the binding members 250 and 260 to the part of the user's body. The band guide member 254 may be configured to limit movement range of the fixing member 252 when the fixing member 252 is fastened to the fixing member fastening hole 253, so that the binding members 250 and 260 are attached to be in close contact with the part of the user's body. The band fixing ring 255 may limit the range of movement of the fixing members 250 and 260 when the fixing member 252 and the fixing member fastening hole 253 are fastened.

Figure 3:
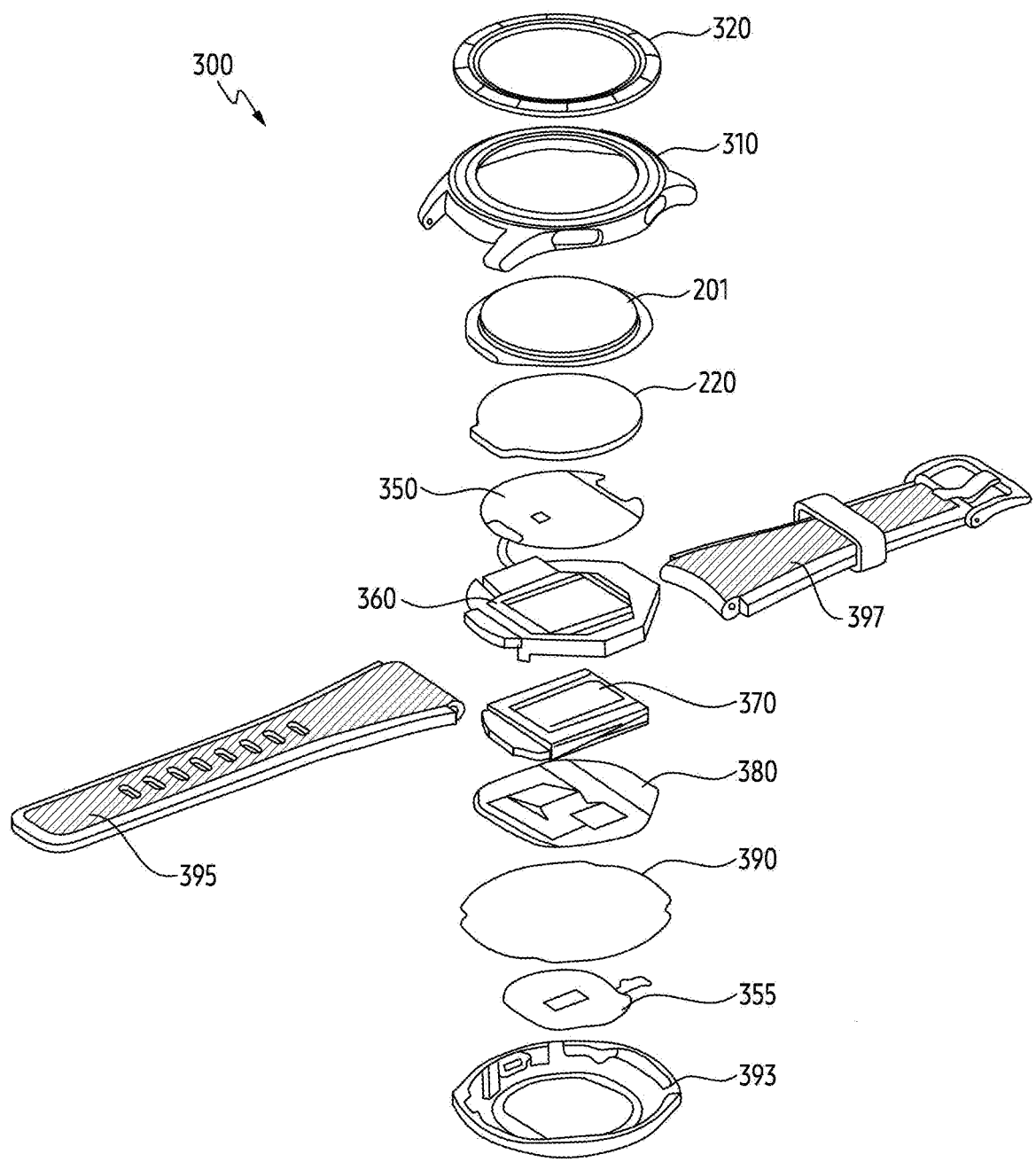
FIG. 3 is an exploded perspective view of an electronic device according to an embodiment.

FIG. 3 is an exploded perspective view of an electronic device according to an embodiment.

Referring to FIG. 3, an electronic device 300 (e.g., the electronic device 101 of FIG. 1, the electronic device 200 of FIG. 2A and/or FIG. 2B) may include a side bezel structure 310, a wheel key 320, a front plate 201, a display 220, a first antenna 350, a second antenna 355, a support member 360 (e.g., bracket), a battery 370, a printed circuit board 380, a sealing member 390, a rear plate 393, and binding members 395 and 397. At least one of the components of the electronic device 300 may be the same as or similar to at least one of the components of the electronic device 200 of FIGS. 2A, and/or 2B, and repeated description thereof will be omitted.

The support member 360 may be disposed inside the electronic device 300 to be connected to the side bezel structure 310 or may be integrated with the side bezel structure 310. The support member 360 may be made of, for example, metal material and/or non-metal (e.g., polymer) material. With respect to the support member 360, the display 220 may be coupled to one surface and the printed circuit board 380 may be coupled to the other surface. A processor, a memory, and/or an interface may be mounted on the printed circuit board 380. The processor may include, for example, one or more of a central processing unit, an application processor, a graphic processing unit (GPU), an application processor sensor processor, or a communication processor.

The memory may include, for example, a volatile memory or a nonvolatile memory. The interface may include, for example, a high-definition multimedia interface (HDMI), a universal serial bus (USB) interface, an SD card interface, and/or an audio interface. The interface may electrically or physically connect the electronic device 300 to an external electronic device, for example, and may include a USB connector, an SD card/MMC connector, or an audio connector.

The battery 370 is a device for supplying power to at least one component of the electronic device 300, and may include, for example, a non-rechargeable primary battery, a rechargeable secondary battery, or a fuel battery. At least a part of the battery 370 may be disposed on substantially the same plane as, for example, the printed circuit board 380. The battery 370 may be integrally disposed inside the electronic device 200 or may be disposed in the electronic device 200 to be user detachable (or removable by a user).

The first antenna 350 may be disposed between the display 220 and the support member 360. The first antenna 350 may include, for example, a near field communication (NFC) antenna, a wireless charging antenna, and/or a magnetic secure transmission (MST) antenna. The first antenna 350 may, for example, perform short-range communication with an external device, wirelessly transmit and receive power required for charging, and transmit short-range communication signals such as ones containing payment data. In another embodiment, an antenna structure may be formed by at least a portion of the side bezel structure 310 and/or a part of the support member 360 or a combination thereof.

The second antenna 355 may be disposed between the printed circuit board 380 and the rear plate 393. The second antenna 355 may include, for example, a near field communication (NFC) antenna, a wireless charging antenna, and/or a magnetic secure transmission (MST) antenna. For example, the second antenna 355 may perform short-range communication with an external device, wirelessly transmit and receive power required for charging, and may transmit a short-range communication signal such as ones containing payment data. In another embodiment, an antenna structure may be formed by at least a portion of the side bezel structure 310 and/or a part of the rear plate 393 or a combination thereof.

The sealing member 390 may be positioned between the side bezel structure 310 and the rear plate 393. The sealing member 390 may be configured to block moisture and foreign material flowing into the space surrounded by the side bezel structure 310 and the rear plate 393 from the outside.

Figure 4A:
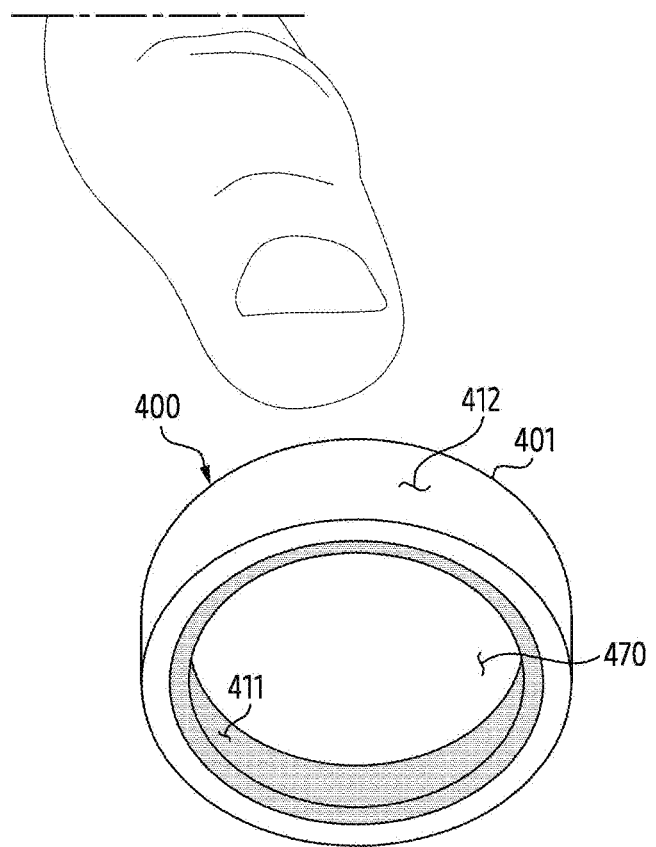
FIG. 4A illustrates a perspective view of an exemplary electronic device according to an embodiment.

FIG. 4A illustrates a perspective view of an exemplary electronic device according to an embodiment.

Referring to FIG. 4A, an electronic device 400 (e.g., an electronic device 101 of FIG. 1) may include a housing 401 including a first surface 411 facing a part (e.g., a finger) of a body of a user and a second surface 412 opposite to the first surface 411. For example, the electronic device 400 may include a ring-shaped housing 401. As an example, the electronic device 400 may be configured in a shape of a ring.

According to an embodiment, the electronic device 400 may be referred to as a wearable device that may be worn by the user. The electronic device 400 may be worn on the part (e.g., a finger) of the body of the user. For example, the electronic device 400 may be fastened to the part of the body of the user. For example, the electronic device 400 may be detachable from the part of the body of the user. For example, the electronic device 400 may have a shape corresponding to the part of the body of the user in order to be worn on the part of the body of the user.

For example, the electronic device 400 may be in contact with the part of the body of the user by being worn by the user. For example, the electronic device 400 may be configured to obtain information on the user through the part of the body of the user by being worn on the user. As an example, information on the user may include health information of the user. However, it is not limited thereto. For example, the electronic device 400 may provide the information on the user through the electronic device 400 and/or an external electronic device connected to the electronic device 400. However, it is not limited thereto.

According to an embodiment, at least a part of the first surface 411 may be in contact with the part of the body of the user when the electronic device 400 is worn on the user. For example, the first surface 411 may surround the part of the body of the user on which the electronic device 400 is worn. For example, the first surface 411 may cover the part of the body of the user on which the electronic device 400 is worn. For example, when the electronic device 400 is worn on the user, the first surface 411 may be configured so that the electronic device 400 is fastened to the part of the body by pressurizing or applying pressure to the part of the body of the user. For example, the first surface 411 may be deformable by the part of the body of the user. For example, based on haptic technology, the electronic device 400 may provide information on the user through the first surface 411.

For example, the second surface 412 may form the exterior of the electronic device 400 with the first surface 411. For example, the second surface 412 may form the ring-shaped housing 401 with the first surface 411. For example, when the electronic device 400 is worn by the user, the second surface 412 may be a surface spaced apart from the part of the body of the user. For example, the first surface 411 may be referred to as an inner circumference surface of the housing 401. The second surface 412 opposite to the first surface 411 may be referred to as an outer circumference surface of the housing 401.

For example, the second surface 412 may be exposed to the outside in a state in which the electronic device 400 is worn by the user. The second surface 412 may be configured with at least one of titanium, stainless steel, and ceramic. The second surface 412 may be configured with a material for protecting against an external impact and/or a scratch. According to an embodiment, the second surface 412 may be coated with an additional material to protect the color of the electronic device 400 and/or the exterior of the electronic device 400.

For example, the first surface 411 may be configured with the same and/or similar material as the second surface 412. According to an embodiment, at least a part of the first surface 411 may be configured with at least one of a molding material, transparent plastic, and/or glass for obtaining data. According to an embodiment, at least a part of the first surface 411 may be configured with a metal for identifying a bio-signal.

According to an embodiment, the electronic device 400 may further include a hole 470 formed by the first surface 411 to pass the part of the body of the user when the electronic device 400 is worn on the user. For example, when the electronic device 400 is worn by the user, the hole 470 may be penetrated by the part of the body of the user. By including the hole 470 configured to pass the part of the body of the user, the electronic device 400 may be configured to be fastened to the part of the body of the user when the user wears the electronic device 400.

According to an embodiment, the electronic device 400 may further include one or more components between the first surface 411 and the second surface 412. For example, the electronic device 400 may include a communication circuit, one or more sensors, and/or a processor between the first surface 411 and the second surface 412. A disposition of one or more components will be described later in FIG. 4B.

Figure 4B:
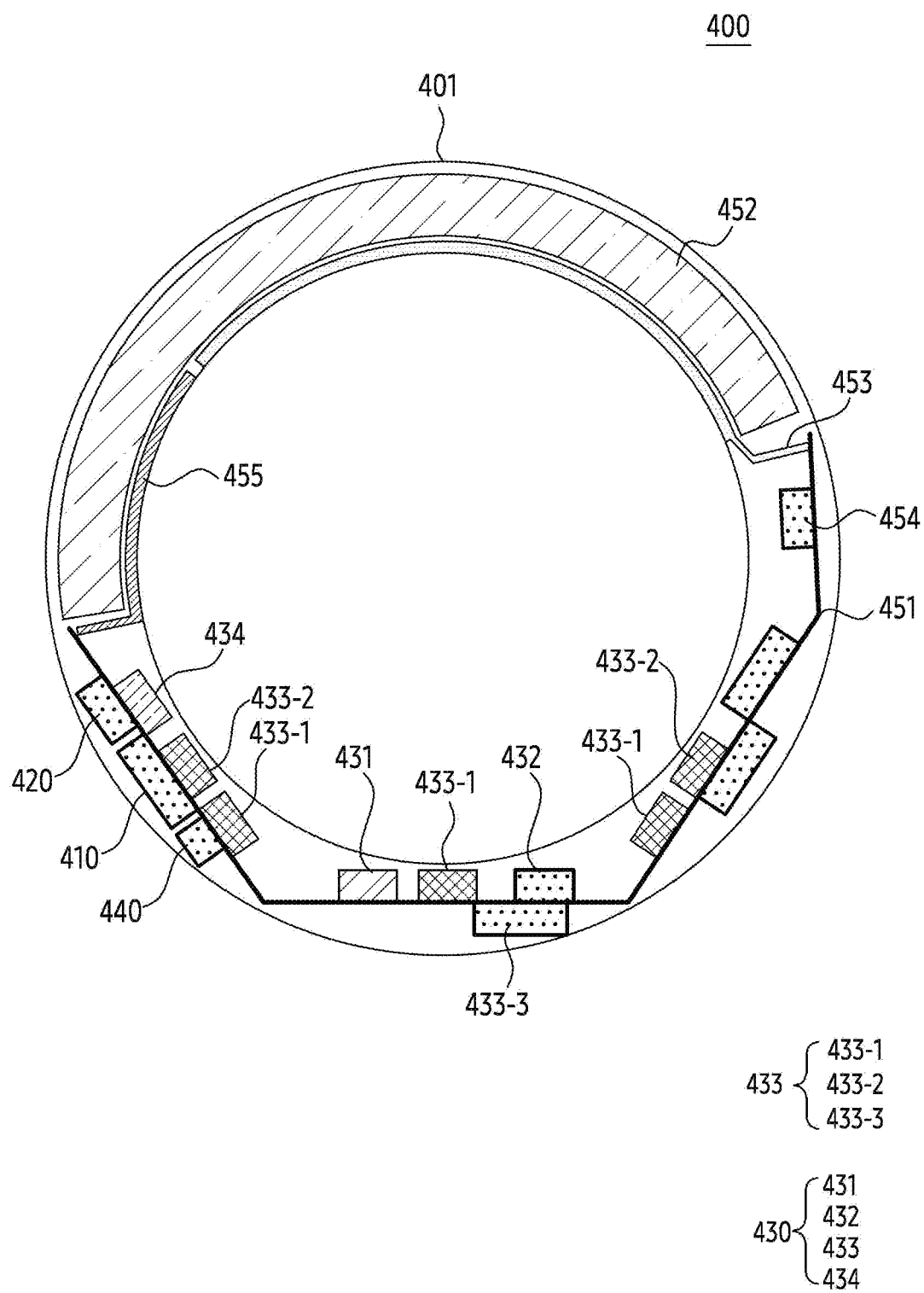
FIG. 4B is an example of a partial cross-sectional view of an electronic device according to an embodiment.

FIG. 4B is an example of a partial cross-sectional view of an electronic device according to an embodiment.

Referring to FIG. 4B, the electronic device 400 may be formed in a shape of a ring. For example, the housing 401 of the electronic device 400 may be formed in a form of the ring that may be worn on a finger of the user. In FIGS. 4A and 4B, the ring-shaped electronic device 400 whose surface is smooth is illustrated as an example, but is not limited thereto. For example, the electronic device 400 may be implemented as a housing including a plurality of planes. For example, the ring-shaped electronic device 400 whose surface is not smooth also may be understood as an embodiment of the present disclosure.

According to an embodiment, the ring-shaped housing 401 may include the first surface 411 in contact with the body of the user in the state of being worn by the user, the second surface 412 exposed to the outside, and a side surface between the first surface 411 and the second surface 412. For example, a space for including (or disposing) at least one or more components (e.g., a processor 410, a communication circuit 420, a sensor 430, and memory 440) may be included between the first surface 411 and the second surface 412.

According to an embodiment, a PCB 451 may be disposed between the first surface 411 and the second surface 412 of the electronic device 400. For example, the processor 410, the communication circuit 420, an acceleration sensor 431, a gyro sensor 432, a photoplethysmography (PPG) sensor 433, a temperature sensor 434, the memory 440, and/or a PMIC 454 may be disposed on the PCB 451. For example, the PCB 451 may be configured with a rigid region and a flexible region. As an example, the rigid region may be referred to as a rigid flexible printed circuit board (RFPCB). As an example, the flexible region may be referred to as a flexible printed circuit board (FPCB).

For example, the PPG sensor 433 may include one or more light emitting circuits 433-1, one or more light receiving circuits 433-2, and a control circuit 433-3. As an example, one or more light emitting circuits 433-1 and one or more light receiving circuits 433-2 may be disposed toward the first surface 411. As an example, the control circuit 433-3 may be disposed toward the second surface 412.

For example, the PMIC 454 may be used to manage power of the electronic device 400. The PMIC 454 may be used to provide (or distribute) power to components requiring power in the electronic device 400. The PMIC 454 may support a wired charging method (e.g., a terminal, a pogo pin) or a wireless charging method (e.g., a wireless power consortium (WPC), NFC) for charging the electronic device 400 through a charging interface 453.

According to an embodiment, a battery 452 may be disposed between the first surface 411 and the second surface 412 of the electronic device 400. The battery 452 may be configured with at least one battery (or battery pack). For example, the battery 452 may be configured so that at least one battery is connected in series and/or parallel. For example, the battery 452 may be configured with a flexible battery pack. For example, the battery 452 may be charged and/or discharged with a secondary battery. For example, the material constituting the battery 452 may be variously configured. As an example, the material constituting the battery 452 may include at least one of lithium ion and mercury.

According to an embodiment, an antenna 455 may be disposed between the first surface 411 and the second surface 412 of the electronic device 400. For example, the antenna 455 may be configured with a single antenna and/or the plurality of segmented antennas. According to an embodiment, the antenna 455 may be configured as the part of the housing 401 of the electronic device 400. For example, the antenna 455 may be electrically connected to the communication circuit 420 through the PCB 451.

Although not illustrated, the electronic device 400 may further include various components in addition to the illustrated components. For example, the electronic device 400 may include a display. The display may be disposed on an outer surface of the housing 401.

According to an embodiment, a first wearable device (e.g., an electronic device 200 of FIG. 2 or an electronic device 300 of FIG. 3) and a second wearable device (e.g., the electronic device 400 of FIGS. 4A and 4B) may be worn and operated by the user. For example, the first wearable device may be worn on a first part (e.g., a wrist) of the body of the user. The second wearable device may be worn on a second part (e.g., a finger) of the body of the user. The second wearable device is configured in a shape of a ring. The second wearable device may operate in the state disposed at a designated position and/or in a designated direction on the second part of the body of the user. However, since the second wearable device is configured in the shape of the ring, it may rotate on the second part of the body of the user. In a case that the second wearable device is rotated on the second part of the body of the user, data obtained through at least one sensor included in the second wearable device may be inaccurate. Accordingly, a method for identifying whether the second wearable device has been rotated may be required.

The first wearable device (or an electronic device connected to the first wearable device and the second wearable device) may identify whether the second wearable device has been rotated based on information on orientation of the first wearable device and information on orientation of the second wearable device, and guide the second wearable device to be disposed at a designated position and/or in a designated direction on the second part of the body of the user.

An operation of the first wearable device (or the electronic device connected to the first wearable device and the second wearable device) according to the above-described embodiment may be described below. The first wearable device described below may correspond to the electronic device 200 of FIGS. 2A and 2B and/or the electronic device 300 of FIG. 3. The second wearable device described below may correspond to the electronic device 400 of FIGS. 4A and 4B.

Figure 5:
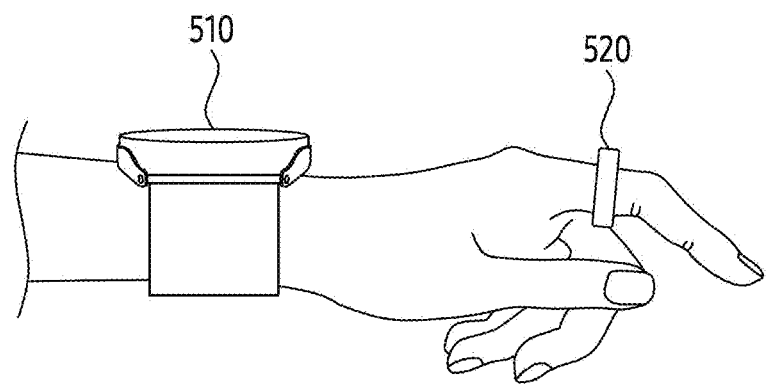
FIG. 5 illustrates an example of an environment including a first wearable device and a second wearable device according to an embodiment.

FIG. 5 illustrates an example of an environment including a first wearable device and a second wearable device according to an embodiment.

Referring to FIG. 5, the first wearable device 510 and the second wearable device 520 may operate in a state of being worn by a user. The first wearable device 510 may be worn on a first part (e.g., a wrist) of a body of the user. The second wearable device 520 may be worn on a second part (e.g., a finger) of the body of the user.

For example, the first wearable device 510 and the second wearable device 520 may be worn on the same arm of the user. As an example, the first wearable device 510 and the second wearable device 520 may be worn on a left arm of the user. The first wearable device 510 may be worn on the wrist of the left arm, and the second wearable device 520 may be worn on one of the fingers of the left arm. As an example, the first wearable device 510 and the second wearable device 520 may be worn on a right arm of the user. The first wearable device 510 may be worn on the wrist of the right arm, and the second wearable device 520 may be worn on one of the fingers of the right arm.

According to an embodiment, the first wearable device 510 may correspond to an electronic device 200 of FIGS. 2A and 2B or the electronic device 300 of FIG. 3. The second wearable device 520 may correspond to the electronic device 400 of FIGS. 4A and 4B.

For example, the first wearable device 510 may be configured in the shape of a watch. The second wearable device may be configured in the shape of the ring. In a case that the second wearable device 520 is configured in the shape of the ring, it may be rotated on the finger of the user. Since at least one of the sensors of the second wearable device 520 is disposed as illustrated in FIG. 4B, the second wearable device 520 may operate in the state in which the at least one of the sensors of the second wearable device 520 is disposed toward a palm of the user. In a case that the second wearable device 520 is rotated on the finger of the user, at least one of the sensors may not be disposed toward the palm of the user. In the case that at least one of the sensors is not disposed toward the palm of the user, information (or data) obtained through at least one sensor may be inaccurate.

For example, the state in which at least one of the sensors is disposed toward the palm of the user may be referred to as a normal wearing state. The state in which an angle between a direction in which a designated part (e.g., a part in which at least one sensor is disposed) of the second wearable device 520 faces and a direction in which the palm faces is within a designated range is referred to as the normal wearing state. For example, although one of the sensors of the second wearable device 520 may not be disposed directly toward the palm of the user, the second wearable device 520 is still in the normal wearing state when the angle between the direction in which the designated part (e.g., a part in which at least one sensor is disposed) of the second wearable device 520 faces and the direction in which the palm faces is within the designated range (or tolerance) as predefined. The state in which at least one sensor is not disposed toward the user's palm may be referred to as an abnormal wearing state. For example, the second wearable device 520 may be the abnormal wearing state when the angle between the direction in which the designated part (e.g., a part in which at least one sensor is disposed) of the second wearable device 520 faces and the direction in which the palm faces is outside of the designated range (or tolerance) as predefined.

For example, the second wearable device 520 may include affordance (e.g., a groove, an electrode, a display, or an indicator) to guide the normal wearing state outside the second wearable device 520. The user of the second wearable device 520 may dispose (or arrange) the second wearable device 520 to operate in the normal wearing state through affordance. For example, the user of the second wearable device 520 can position and/or reposition the second wearable device 520 on the part of the body (e.g., finger) to coincide with (fit, and/or touch) the groove, the electrode, the display, and/or the indicator such that the second wearable device 520 is positioned to operate in the normal wearing state.

According to an embodiment, the first wearable device 510 may be connected to the second wearable device 520. For example, the user of the first wearable device 200 and the second wearable device 520 are the same. The first wearable device 510 and the second wearable device 520 may be owned (or used) by the same user.

For example, the second wearable device 520 may be a device connected to the first wearable device 510 in a short distance and (concurrently) used by the same user. The second wearable device 520 may be used to control an operation of the first wearable device 510. The second wearable device 520 may be used to receive information obtained through the first wearable device 510 and process the received information. The first wearable device 510 may control the second wearable device 520. The user may change a setting information of the second wearable device 520 by using the first wearable device 510.

According to an embodiment, the first wearable device 510 may identify that the second wearable device 520 operates in the abnormal wearing state based on information received from the second wearable device 520. The first wearable device 510 may provide a notification to guide changing at least one of a position or a direction of the second wearable device 520 so that the second wearable device 520 operates in the normal wearing state. Specific operations for the first wearable device 510 to perform the above-described operation will be described later in FIGS. 7 to 16.

According to an embodiment, the first wearable device 510 and the second wearable device 520 may be controlled by an external electronic device. The external electronic device may identify that the second wearable device 520 operates in the abnormal wearing state by using information obtained from the first wearable device 510 and/or information obtained from the second wearable device 520. The external electronic device may provide the notification to guide changing at least one of the position or the direction of the second wearable device 520 so that the second wearable device 520 operates in the normal wearing state. A specific example in which the first wearable device 510 and the second wearable device 520 are controlled by the external electronic device will be described later in FIGS. 17A and 17B.

Figure 6:
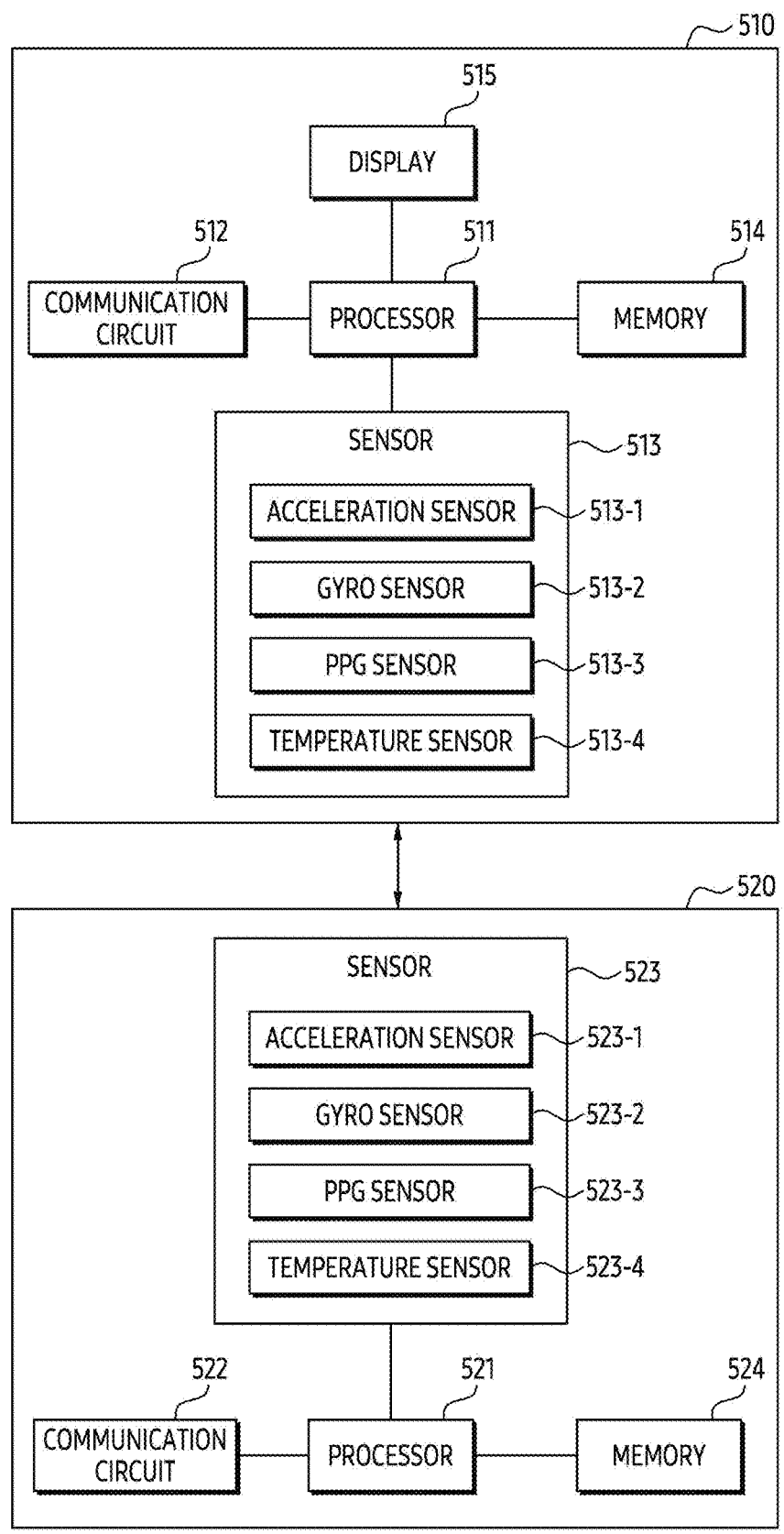
FIG. 6 is a simplified block diagram of a first wearable device and a second wearable device according to an embodiment.

FIG. 6 is a simplified block diagram of a first wearable device and a second wearable device according to an embodiment.

Referring to FIG. 6, a first wearable device 510 and a second wearable device 520 may operate in a connected state. For example, the first wearable device 510 and the second wearable device 520 may be used to obtain (or identify) information on the user. The first wearable device 510 may be used to control the second wearable device 520.

According to an embodiment, the first wearable device 510 may include a processor 511, a communication circuit 512, a sensor 513, memory 514, and/or a display 515. According to an embodiment, the first wearable device 510 may include at least one of the processor 511, the communication circuit 512, the sensor 513, the memory 514, and/or the display 515. For example, at least a part of the processor 511, the communication circuit 512, the sensor 513, the memory 514, and/or the display 515 may be omitted according to an embodiment. For example, the first wearable device 510 may include at least part of the components of the electronic device 101 of FIG. 1. The first wearable device 510 may include any of the components of the electronic device 101 of FIG. 1 to function as discussed herein.

According to an embodiment, the processor 511 may correspond to a processor 120 of FIG. 1. The processor 511 may be operably (or operatively) coupled or connected with the communication circuit 512, the sensor 513, the memory 514, and the display 515. That the processor 511 is operably coupled or connected with the communication circuit 512, the sensor 513, the memory 514, and the display 515 may mean that the processor 511 may control the communication circuit 512, the sensor 513, the memory 514, and the display 515. For example, the communication circuit 512, the sensor 513, the memory 514, and the display 515 may be controlled by the processor 511.

Although illustrated based on different blocks, an embodiment is not limited thereto, and the part (e.g., at least the part of the processor 511, the communication circuit 512, and the memory 514) of the hardware of FIG. 3 may be included in a single integrated circuit, such as a system on chip (SoC).

According to an embodiment, the processor 511 may be configured with at least one processor. For example, the processor 511 may be configured with a main processor that performs high-performance processing and an auxiliary processor that performs low-power processing. At least the part of the sensor 513 may be connected to the auxiliary processor. At least the part of the sensor connected to the auxiliary processor may obtain data on the user for 24 hours. According to an embodiment, according to the state and/or operation of the first wearable device 510, one of the main processor and the auxiliary processor may be activated. As an example, in the state in which the battery of the first wearable device 510 is insufficient, the auxiliary processor may be activated. For example, in the state in which more accurate data on the user is required, the main processor may be activated.

According to an embodiment, the processor 511 may include a hardware component for processing data based on one or more instructions. For example, the hardware component for processing data may include an arithmetic and logic unit (ALU), a field programmable gate array (FPGA), and/or a central processing unit (CPU).

For example, the processor 511 may include an application processor, a supplementary processor (e.g., a sensor hub, a microcontroller unit (MCU), a central processor unit (CPU), a neural processing unit (NPU), a graphic processing unit (GPU), and/or a processor for IoT (e.g., a processor integrated with a communication module).

According to an embodiment, the processor 511 may determine an operation timing of the sensor 513. The processor 511 may control the operation of the sensor 513. The processor 511 may process information obtained from the sensor 513.

According to an embodiment, the first wearable device 510 may include a communication circuit 512. The communication circuit 512 may correspond to at least the part of a communication module 190 of FIG. 1. For example, the communication circuit 512 may be used for various radio access technology (RAT). For example, the communication circuit 512 may be used to perform Bluetooth communication, wireless local area network (WLAN) communication, Zigbee communication, near field communication (NFC), ultra wide band (UWB) communication, radio-frequency identification (RFID) communication, or ANT+ communication. For example, the communication circuit 512 may be used to perform cellular communication. For example, the processor 511 may establish a connection with another electronic device (e.g., the second wearable device 520) through the communication circuit 512. For example, the processor 511 may identify (or measure) a position of the first wearable device 510, based on received or transmitted wireless signal (e.g., global positioning system (GPS) signals) by using the communication circuit 512. According to an embodiment, the communication circuit 512 may be configured to be integrated with the processor 511.

According to an embodiment, the first wearable device 510 may include the sensor 513. The sensor 513 may be used to obtain various information. For example, the sensor 513 may be used to obtain information on the user. Information on the user may include data on the body of the user. As an example, the sensor 513 may be used to obtain body temperature data (or body temperature information), heart rate data (or heart rate information), and/or motion data (or motion information) of the user. For example, the sensor 513 may be configured with at least one sensor. For example, the sensor 513 may correspond to a sensor module 176 of FIG. 1.

For example, the sensor 513 may include an acceleration sensor 513-1. The acceleration sensor 513-1 may be used to identify a change in acceleration of the first wearable device 510. As an example, the acceleration sensor 513-1 may identify (or measure, detect) acceleration of the first wearable device 510 in three directions including the x-axis, y-axis, and z-axis. As an example, the acceleration sensor 513-1 may be configured to identify acceleration of about four times or more of the acceleration of gravity on an arbitrary axis. As an example, the acceleration sensor 513-1 may have resolution of a designated size (e.g., 16 bits).

For example, the sensor 513 may include a gyro sensor 513-2. The gyro sensor 513-2 may identify (or measure, detect) angular velocity of the first wearable device 510 in three directions including the x-axis, y-axis, and z-axis. According to an embodiment, the first wearable device 510 may include an inertial sensor including an acceleration sensor 513-1 and a gyro sensor 513-2.

For example, by using at least one of the acceleration sensor 513-1 and/or the gyro sensor 513-2, the first wearable device 510 may identify at least one of data on movement of the first wearable device 510, data on a gesture of the user, data on an amount of impact, data on orientation of the first wearable device 510, and/or activity information of the user (e.g., sitting, movement, sports activity, etc.).

For example, the sensor 513 may include a photoplethysmography (PPG) sensor 513-3. The PPG sensor 513-3 may be used to measure a pulse (or the change in the amount of blood in a blood vessel) by identifying the amount of the change in the amount of light sensitivity according to the change in blood vessel volume. The PPG sensor 513-3 may include one or more photodiodes (PD) and one or more light emitting diodes (LED). For example, the PPG sensor 513-3 may be used to identify the change in blood flow in the blood vessel during a heartbeat. The PPG sensor 513-3 may identify the change in the blood flow in the blood vessel during the heartbeat in the state in which an optical sensor contacts the skin above a peripheral blood vessel. The processor 511 may identify the amount of blood flow based on the PPG signal and waveform, and identify the amount of change in the amount of blood flow.

For example, the PPG sensor 513-3 may include a transmissive PPG sensor and/or a reflective PPG sensor.

As an example, the PPG sensor 513-3 may output light toward skin of the user through one of an LED (e.g., green, red, or infrared (IR)), a laser, and a vertical cavity surface emitting laser (VCSEL). The PPG sensor 513-3 may identify light reflected and/or transmitted from skin of the user through at least one of a PD and/or a complementary metal oxide semiconductor (CMOS) camera. Based on reflected and/or transmitted light, the PPG sensor 513-3 may store a value identified through an analog to digital converter (ADC) in memory 514 (or buffer).

As an example, a transmissive PPG sensor may identify light transmitted through the blood vessel through the PD disposed on the opposite side of the LED. Based on intensity of light transmitted through the blood vessel, the transmissive PPG sensor may identify the blood flow of the user. As an example, a reflective PPG sensor may output light toward skin of the user through the LED. The reflective PPG sensor may identify at least the part of received light reflected by the blood vessel through the PD disposed on substantially the same plane as the LED. Based on intensity of light reflected by the blood vessel, the reflective PPG sensor may identify the blood flow of the user. For example, a multi-light source may be used as an LED. For example, the LED may use green light, which is a complementary color to blood.

For example, the sensor 513 may include a temperature sensor 513-4. The temperature sensor 513-4 may be used to identify (or measure) the skin temperature in the part of the body of the user (e.g., wrist). For example, the temperature sensor 513-4 may include a contact type temperature sensor and a non-contact type temperature sensor. The identified temperature value may be stored in the memory 514 or may be transferred to the processor 511. The processor 511 may identify (or estimate) condition of the user, an environment in which the user is positioned, and/or the body temperature of the user based on the identified temperature value.

Although not illustrated, the sensor 513 may further include various sensor for obtaining (or identifying, measuring, and sensing) various data on the user and/or the first wearable device 510.

According to an embodiment, the first wearable device 510 may include the memory 514. The memory 514 may be used to store information or data. For example, the memory 514 may be used to store data obtained from the user. For example, the memory 514 may correspond to a memory 130 of FIG. 1. For example, the memory 514 may be a volatile memory unit or units. For example, the memory 514 may be a non-volatile memory unit or units. As another example, the memory 514 may be another type of computer readable medium, such as a magnetic or optical disk. For example, the memory 514 may store data obtained based on an operation (e.g., an algorithm execution operation) performed by the processor 511. For example, the memory 514 may store data (e.g., information on the user) obtained by the sensor 513. According to an embodiment, the memory 514 may be configured in an integrated form with the processor 511.

Although not illustrated in FIG. 6, the first wearable device 510 may further include various components. For example, the first wearable device 510 may further include at least one of an antenna, a power management integrated circuit (PMIC), a battery, and a flexible printed circuit board (FPCB). According to an embodiment, the first wearable device 510 may further include a biometric sensor (e.g., an electrocardiogram (ECG) sensor) including the PPG sensor 513-3.

According to an embodiment, the first wearable device 510 may include the display 515. The display 515 may output visualized information to the user. For example, the display 515 may be controlled by the processor 511 including a circuit such as the graphic processing unit (GPU) and output visualized information to the user. For example, the display 515 may correspond to a display module 160 of FIG. 1.

For example, the display 515 may be used to display a screen for representing information on the user. For example, the display 515 may be used to provide a notification to guide a posture of the user. For example, the display 515 may be used to provide the notification to guide changing at least one of the position or a direction of the second wearable device 520.

According to an embodiment, the second wearable device 520 may include a processor 521, a communication circuit 522, a sensor 523, and/or a memory 524. According to an embodiment, the second wearable device 520 may include at least one of the processor 521, the communication circuit 522, the sensor 523, and/or the memory 524. For example, at least the part of the processor 521, the communication circuit 522, the sensor 523, and/or the memory 524 may be omitted according to an embodiment. For example, the second wearable device 520 may correspond to the electronic device 101 of FIG. 1. For example, the second wearable device 520 may include at least the part of the components of the electronic device 101 of FIG. 1.

For example, the processor 521 may correspond to the processor 511 of the first wearable device 510. For example, the communication circuit 522 may correspond to the communication circuit 512 of the first wearable device 510. For example, the memory 524 may correspond to the memory 514 of the first wearable device 510.

According to an embodiment, the sensor 523 may be used to obtain various information. For example, the sensor 523 may correspond to the sensor 513 of the first wearable device 510. The sensor 523 may include at least one of an acceleration sensor 523-1, a gyro sensor 523-2, a PPG sensor 523-3, and/or a temperature sensor 523-4. According to an embodiment, the sensor 523 may obtain information distinguished from information obtained by the sensor 513 of the first wearable device 510. For example, the sensor 523 may be used to identify (or measure) data on the user on a second part (e.g., a finger) of the body of the user.

According to an embodiment, the second wearable device 520 may further include various components in addition to the illustrated components. According to an embodiment, the second wearable device 520 may further include a display.

Figure 7:
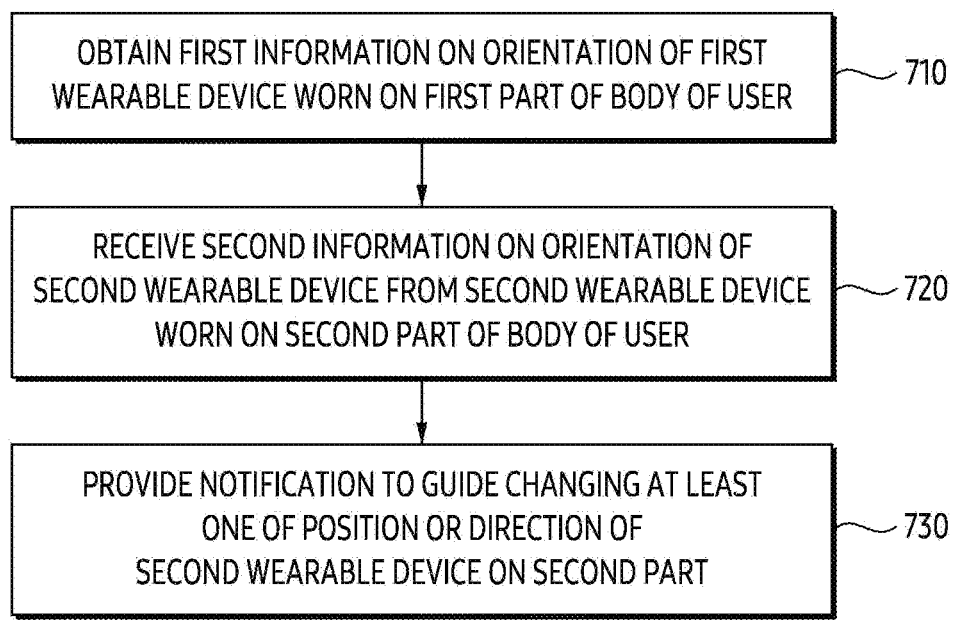
FIG. 7 illustrates a flowchart on an operation of a first wearable device according to an embodiment.

FIG. 7 illustrates a flowchart on an operation of a first wearable device according to an embodiment. In the following embodiment, each of operations may be performed sequentially, but is not necessarily performed sequentially. For example, an order of each of operations may be changed, and at least two operations may be performed in parallel.

In an operation 710, a processor 511 of a first wearable device 510 may obtain first information on orientation of the first wearable device 510 worn on a first part of a body of a user. For example, the processor 511 may obtain, using a sensor 513 (e.g., an acceleration sensor 513-1 or a gyro sensor 513-2), first information on orientation of the first wearable device 510 worn on the first part of the body of the user.

For example, first information may include a first rotation angle of the first wearable device 510 according to a designated axis. As an example, the designated axis may be configured in a direction in which a finger faces in a state in which the first wearable device 510 is worn on a wrist of the user. The processor 511 may identify the first rotation angle based on a rotation of the first wearable device 510 clockwise (or counterclockwise), based on the designated axis. As an example, the processor 511 may identify the first rotation angle based on a direction in which a display 515 of the first wearable device 510 faces and a direction in which the designated axis faces. The first rotation angle may mean an angle at which the first wearable device 510 is rotated according to the rotation of a forearm bone (or wrist) of the user. For example, a specific operation for identifying the first rotation angle will be described later in FIG. 8A.

In an operation 720, the processor 511 may receive, from the second wearable device 520 worn on a second part of the body of the user, second information on orientation of the second wearable device 520. For example, a processor 521 of the second wearable device 520 may obtain, using a sensor 523 (e.g., an acceleration sensor 523-1 or a gyro sensor 523-2), second information on orientation of the second wearable device 520 worn on the second part of the body of the user. The processor 521 of the second wearable device 520 may transmit second information on the orientation of the second wearable device 520 to the first wearable device 510. The processor 511 of the first wearable device 510 may identify second information based on receiving second information on the orientation of the second wearable device 520 from the second wearable device 520.

For example, second information may include a second rotation angle of the second wearable device 520 according to the designated axis. As an example, the designated axis may be configured to correspond to a direction perpendicular to a plane corresponding to a hole of the second wearable device 520. As an example, the designated axis may be configured in a direction in which a finger faces in a state in which the second wearable device 520 is worn on the finger of the user. The second wearable device 520 (or the processor 521 of the second wearable device 520) may identify the second rotation angle based on a rotation of the second wearable device 520 clockwise (or counterclockwise), based on the designated axis. As an example, the second wearable device 520 (or the processor 521 of the second wearable device 520) may identify the second rotation angle based on a direction in which the designated part of the second wearable device 520 faces and a direction in which the designated axis faces.

According to an embodiment, the second rotation angle may be identified according to movement of the user (e.g., rotation of the forearm bone (or wrist)) or the rotation of the second wearable device 520 on the second part (e.g., a finger) of the body of the user. For example, a specific operation for identifying the second rotation angle will be described later in FIG. 8B.

According to an embodiment, the processor 511 may synchronize an axis (hereinafter, a first axis) for identifying the first rotation angle in the first wearable device 510 and an axis (hereinafter, a second axis) for identifying the second rotation angle in the second wearable device 520. For example, the first axis for identifying the first rotation angle in the first wearable device 510 may be configured in the direction in which the finger faces in the state in which the first wearable device 510 is worn on the wrist of the user. The second axis for identifying the second rotation angle of the second wearable device 520 may be configured to correspond to the direction perpendicular to the plane corresponding to the hole of the second wearable device 520. The processor 511 may perform an operation for configuring the first axis and the second axis substantially the same. For example, the processor 511 may perform an operation for configuring the first axis and the second axis substantially the same before obtaining first information and receiving second information. An operation of the processor 511 for configuring the first axis and the second axis substantially the same will be described later in FIG. 15.

In an operation 730, the processor 511 may provide a notification to guide changing at least one of a position or a direction of the second wearable device 520 on the second part of the body of the user. For example, the processor 511 may, based on first information and second information, provide the notification to guide changing at least one of the position or the direction of the second wearable device 520 on the second part (e.g., finger) of the body of the user.

According to an embodiment, based on first information and second information, the processor 511 may identify a posture of the second wearable device 520. Based on first information and second information, the processor 511 may identify the position of the second wearable device 520 with respect to the first wearable device 510. Based on first information and second information, the processor 511 may identify a rotation angle of the second wearable device 520 with respect to the first wearable device 510. Based on first information and second information, the processor 511 may identify a positional relationship between the first wearable device 510 and the second wearable device 520.

According to an embodiment, based on first information and second information, the processor 511 may identify whether a difference between the first rotation angle and the second rotation angle is outside a designated range. Based on the difference between the first rotation angle and the second rotation angle being outside the designated range, the processor 511 may identify that the second wearable device 520 has rotated on the second part of the body of the user. Based on identifying that the second wearable device 520 has rotated on the second part of the body of the user, the processor 511 may identify a wearing state of the second wearable device 520 as an abnormal wearing state. For example, the normal wearing state may mean the state in which the angle between the direction in which the designated part (e.g., the part in which at least one sensor is disposed) of the second wearable device 520 faces and the direction in which a palm faces is within the designated range. For example, the abnormal wearing state may mean the state in which the angle between the direction in which the designated part (e.g., the part in which at least one sensor is disposed) of the second wearable device 520 faces and the direction in which a palm faces is outside the designated range.

According to an embodiment, based on first information and second information, the processor 511 may provide the notification to guide the wearing state of the second wearable device 520 to change from the abnormal wearing state to the normal wearing state. Accordingly, the notification on the first wearable device 510 guides the user to change the second wearable device 520 from the abnormal wearing state to the normal wearing state, thereby allowing the second wearable device 520 to provide information about the second part of the body of the user.

For example, the second wearable device 520 may include affordance (e.g., a groove, an electrode, a display, or an indicator) to guide the normal wearing state outside the second wearable device 520. The processor 511 may provide the notification for the user to dispose (or arrange) the second wearable device 520 so that the second wearable device 520 operates in the normal wearing state through the affordance.

According to an embodiment, the processor 511 may identify a value for the movement of the first wearable device 510 and a value for the movement of the second wearable device 520. Based on identifying that the value for movement of the first wearable device 510 and the value for movement of the second wearable device 520 are within the designated movement range, the processor 511 may obtain first information. The processor 511 may perform the operation 710, based on identifying that the value for movement of the first wearable device 510 and the value for movement of the second wearable device 520 are within the designated movement range. The processor 511 may obtain first information and second information, based on the fact that movement of the user is not identified. In the case that the user moves, the processor 511 may not accurately identify the positional relationship between the first wearable device 510 and the second wearable device 520. Accordingly, the processor 511 may perform the operations 710 and 720 to identify the positional relationship between the first wearable device 510 and the second wearable device 520 only in case that movement of the user is not identified.

Figure 8A:
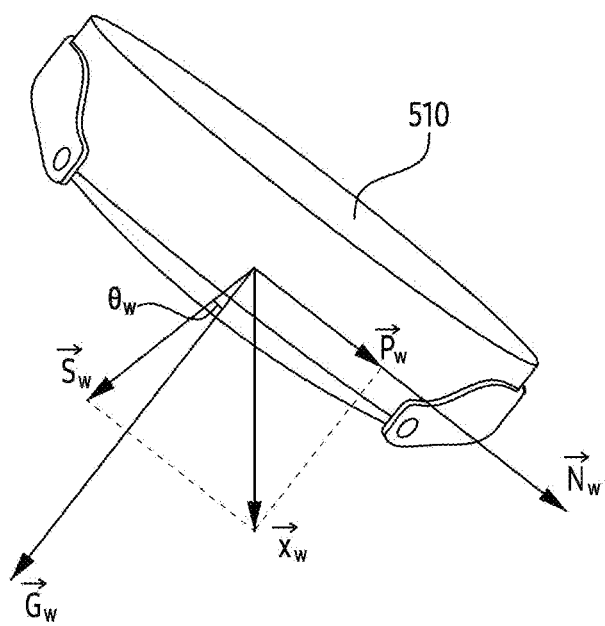
FIG. 8A illustrates an example of a first rotation angle of a first wearable device according to an embodiment.

FIG. 8A illustrates an example of a first rotation angle of a first wearable device according to an embodiment.

Figure 8B:
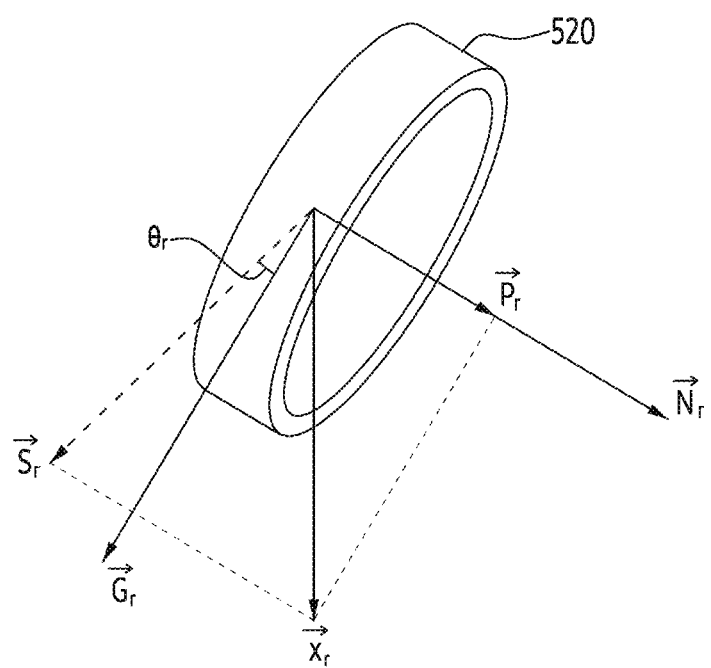
FIG. 8B illustrates an example of a second rotation angle of a second wearable device according to an embodiment.

FIG. 8B illustrates an example of a second rotation angle of a second wearable device according to an embodiment.

Referring to FIG. 8A, a processor 511 of a first wearable device 510 may identify data on three vectors, using an acceleration sensor 513-1 and/or a gyro sensor 513-2, to identify the first rotation angle of the first wearable device 510. The processor 511 may identify the three vectors to identify the first rotation angle of the first wearable device 510.

According to an embodiment, the processor 511 of the first wearable device 510 may identify a vector ($\vec{N_w}$), a vector ($\vec{G_w}$), and a vector ($\vec{X_w}$). For example, a first vector ($\vec{N_w}$) is a unit vector facing from a first part to a second part (e.g., a finger) of the user in a state in which the first wearable device 510 is worn on the first part (e.g., a wrist) of a body of a user. The vector ($\vec{G_w}$) is a unit vector facing a direction opposite to the direction in which a display 515 of the first wearable device 510 faces. The vector ($\vec{G_w}$) may be perpendicular to the vector ($\vec{N_w}$). The vector ($\vec{X_w}$) may be an acceleration value in the direction of gravity identified through the acceleration sensor 513-1 in a state in which movement of the first wearable device 510 is not identified. Since the acceleration sensor 513-1 identifies acceleration in the direction of gravity, the vector ($\vec{X_w}$) may mean the acceleration value in the direction of gravity.

For example, the vector ($\vec{X_w}$) may be divided into a vector ($\vec{P_w}$) and a vector ($\vec{S_w}$). The vector ($\vec{X_w}$) is configured as the following equation.

$$\vec{X_w} = \vec{P_w} + \vec{S_w} \quad \text{[Equation 1]}$$

In Equation 1, the vector ($\vec{P_w}$) is configured as in Equation 2. The vector ($\vec{P_w}$) is a projection vector for the vector ($\vec{N_w}$) of the vector ($\vec{X_w}$). The vector ($\vec{S_w}$) is configured as in Equation 3.

$$\vec{P_w} = (\vec{X_w} \cdot \vec{N_w}) \times \vec{N_w} \quad \text{[Equation 2]}$$

$$\vec{S_w} = \vec{X_w} - \vec{P_w} \quad \text{[Equation 3]}$$

Referring to Equation 3, the vector ($\vec{S_w}$) is a component that belongs to a plane perpendicular to the vector ($\vec{N_w}$) among the vectors ($\vec{X_w}$).

The processor 511 may identify the first rotation angle ($\theta_w$) between the vector ($\vec{S_w}$) and the vector ($\vec{G_w}$). The first rotation angle ($\theta_w$) is configured as Equation 4.

$$\theta_w = \cos^{-1}\left(\frac{\vec{S_w} \cdot \vec{G_w}}{|\vec{S_w}||\vec{G_w}|}\right), \quad 0 \leq |\theta_w| \leq \pi \quad \text{[Equation 4]}$$

As described above, the processor 511 may identify the first rotation angle ($\theta_w$). The first rotation angle ($\theta_w$) may mean an angle rotated with respect to an axis corresponding to the direction of the vector ($\vec{N_w}$).

Referring to FIG. 8B, a processor 521 of a second wearable device 520 may identify data on three vectors, using an acceleration sensor 523-1 and/or a gyro sensor 523-2, to identify the second rotation angle of the second wearable device 520. The processor 521 may identify the three vectors to identify a second rotation angle of the second wearable device 520.

According to an embodiment, the processor 521 of the second wearable device 520 may identify a vector, a vector ($\vec{N_r}$), and a vector ($\vec{G_r}$). For example, a first vector ($\vec{N_r}$) is a unit vector facing toward the end (e.g., a nail direction) of a second part (e.g., a finger) of a user in a state in which the second wearable device 520 is worn on a second part of a body of the user (e.g., a finger). The vector ($\vec{G_r}$) is a unit vector in a downward direction of the second wearable device 520. For example, in the case that the second wearable device 520 is worn on the finger of the user in a normal wearing state, the vector ($\vec{G_r}$) is a unit vector in the direction in which a palm of the finger faces. The vector ($\vec{G_r}$) may be perpendicular to the vector ($\vec{N_r}$). The vector ($\vec{X_r}$) may be an acceleration value in the direction of gravity identified through the acceleration sensor 523-1 in the state in which movement of the second wearable device 520 is not identified. Since the acceleration sensor 523-1 identifies acceleration in the direction of gravity, the vector ($\vec{X_r}$) may mean the acceleration value in the direction of gravity.

For example, the vector ($\vec{X_r}$) may be divided into a vector ($\vec{P_r}$) and a vector ($\vec{S_r}$). The vector ($\vec{X_r}$) is configured as the following equation.

$$\vec{X_r} = \vec{P_r} + \vec{S_r} \quad \text{[Equation 5]}$$

In Equation 5, the vector ($\vec{P_r}$) is configured as Equation 6. The vector ($\vec{P_r}$) is a projection vector for the vector ($\vec{N_r}$) of the vector ($\vec{X_r}$). The vector ($\vec{S_r}$) is configured as Equation 7.

$$\vec{P_r} = (\vec{X_r} \cdot \vec{N_r}) \times \vec{N_r} \quad \text{[Equation 6]}$$

$$\vec{S_r} = \vec{X_r} - \vec{P_r} \quad \text{[Equation 7]}$$

Referring to Equation 7, the vector ($\vec{S_r}$) is a component that belongs to a plane perpendicular to the vector ($\vec{N_r}$) among the vectors ($\vec{X_r}$).

The processor 521 may identify the second rotation angle ($\theta_r$) between the vector ($\vec{S_r}$) and the vector ($\vec{G_r}$). The second rotation angle ($\theta_r$) is configured as Equation 8.

$$\theta_r = \cos^{-1}\left(\frac{\vec{S_r} \cdot \vec{G_r}}{|\vec{S_r}||\vec{G_r}|}\right), \quad 0 \leq |\theta_r| \leq \pi \quad \text{[Equation 8]}$$

As described above, the processor 511 may identify the second rotation angle ($\theta_r$). The second rotation angle ($\theta_r$) may mean an angle rotated with respect to an axis corresponding to the direction of the vector ($\vec{N_r}$).

Referring to FIGS. 8A and 8B, the processor 511 (or the processor 521) may synchronize the vector ($\vec{N_w}$) and the vector ($\vec{N_r}$). The processor 511 may configure the vector ($\vec{N_w}$) and the vector ($\vec{N_r}$) to be the same. The processor 511 may synchronize the vector ($\vec{G_w}$) and the vector ($\vec{G_r}$). The processor 511 may configure the vector ($\vec{G_w}$) and the vector ($\vec{G_r}$) to be the same.

After the vector ($\vec{N_w}$) and the vector ($\vec{N_r}$) are synchronized, and the vector ($\vec{G_w}$) and the vector ($\vec{G_r}$) are synchronized, the processor 511 may identify the first rotation angle ($\theta_w$) and the second rotation angle ($\theta_r$). Based on a difference between the first rotation angle ($\theta_w$) and the second rotation angle ($\theta_r$), the processor 511 may identify a size of angle by which the second wearable device 520 is rotated on the second part of the body of the user from the normal wearing state of the second wearable device 520.

As described above, an operation of the processor 511 for synchronizing the vector ($\vec{N_w}$) and the vector ($\vec{N_r}$) and synchronizing the vector ($\vec{G_w}$) and the vector ($\vec{G_r}$) will be described later in FIG. 15.

Hereinafter, in FIGS. 9 to 13, an example of the first rotation angle ($\theta_w$) and the second rotation angle ($\theta_r$) identified according to movement (e.g., movement of the wrist or movement of the finger of the user) of the user may be described. In embodiments described below, based on the synchronization procedure described later in FIG. 15, the vector ($\vec{N_w}$) and the vector ($\vec{N_r}$) may be configured to be the same (or similar). Based on the synchronization procedure described later in FIG. 15, the vector ($\vec{G_w}$) and the vector ($\vec{G_r}$) may be configured to be the same (or similar).

Figure 9:
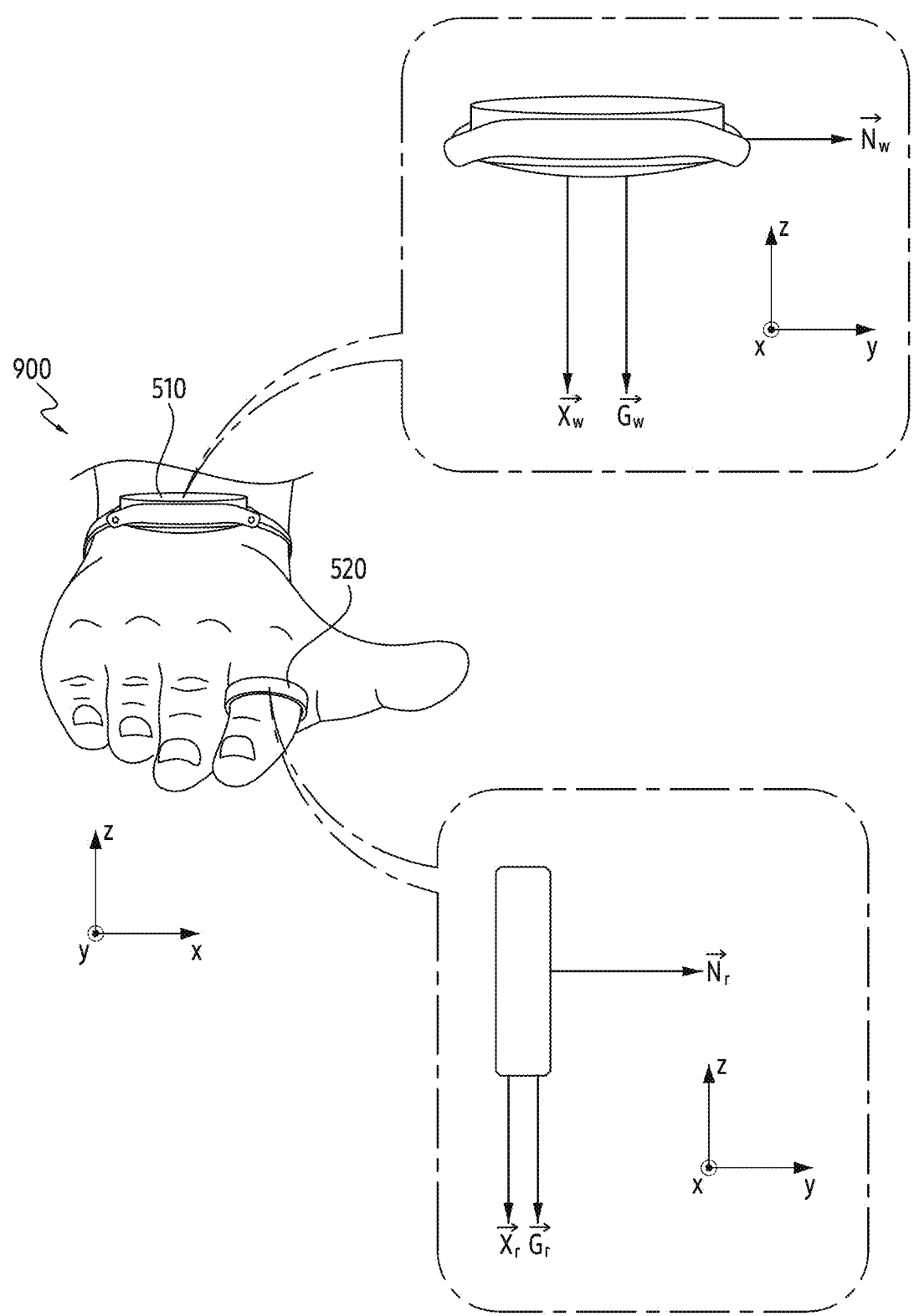
FIG. 9 illustrates an example of a first rotation angle and a second rotation angle according to an embodiment.

FIG. 9 illustrates an example of a first rotation angle and a second rotation angle according to an embodiment.

Referring to FIG. 9, a first wearable device 510 may be worn on a wrist of a user. A second wearable device 520 may be worn on a finger (e.g., an index finger) of the user. The user may perform a posture 900 in a state in which the first wearable device 510 and the second wearable device 520 are worn.

In the posture 900, a vector ($\vec{N_w}$), a vector ($\vec{G_w}$), and a vector ($\vec{X_w}$) of the first wearable device 510 may be identified. The vector ($\vec{X_w}$) may be perpendicular to the vector ($\vec{N_w}$). The vector ($\vec{X_w}$) may be parallel to the vector ($\vec{G_w}$). Accordingly, the first rotation angle ($\theta_w$) may be 0 degree (or an angle range corresponding to 0 degree).

In the posture 900, a vector ($\vec{N_r}$), a vector ($\vec{G_r}$), and a vector ($\vec{X_r}$) of the second wearable device 520 may be identified. The vector ($\vec{X_r}$) may be perpendicular to the vector ($\vec{N_r}$). The vector ($\vec{X_r}$) may be parallel to the vector ($\vec{G_r}$). Accordingly, the second rotation angle ($\theta_r$) may be 0 degree (or an angle range corresponding to 0 degree).

In the posture 900, the difference between the first rotation angle ($\theta_w$) and the second rotation angle ($\theta_r$) may be configured as Equation 9 below.

$$|\theta_w - \theta_r| = 0° \qquad \text{[Equation 9]}$$

Referring to FIG. 9, the processor 511 may receive, from the second wearable device 520, information on orientation of the second wearable device 520 including the second rotation angle ($\theta_r$). The processor 511 may identify the first rotation angle ($\theta w$) of the first wearable device 510. The processor 511 may identify the difference between the first rotation angle ($\theta_w$) and the second rotation angle ($\theta_r$) as 0 degree in the posture 900.

According to an embodiment, the processor 511 of the first wearable device 510 may receive data on the vector ($\vec{N_r}$), data on the vector ($\vec{G_r}$), and data on the vector ($\vec{X_r}$) from the second wearable device 520. The processor 511 may identify the second rotation angle ($\theta_r$) based on data on the vector ($\vec{N_r}$), data on the vector ($\vec{G_r}$), and data on the vector ($\vec{X_r}$). The processor 511 may identify a difference between the identified second rotation angle ($\theta_r$) and the first rotation angle ($\theta_w$) as 0 degree.

Figure 10:
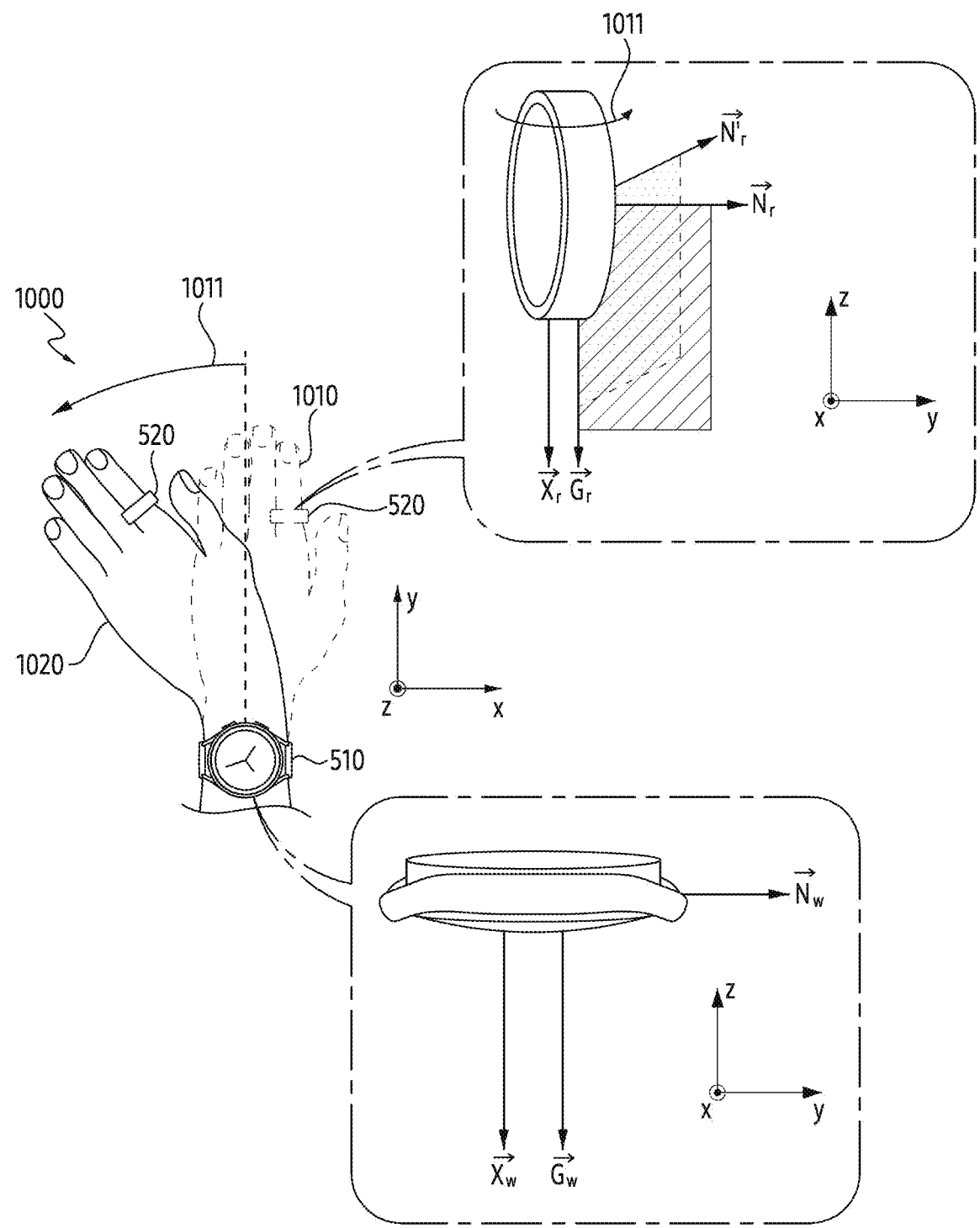
FIG. 10 illustrates an example of a first rotation angle and a second rotation angle according to an embodiment.

FIG. 10 illustrates an example of a first rotation angle and a second rotation angle according to an embodiment.

Referring to FIG. 10, a first wearable device 510 may be worn on a wrist of a user. A second wearable device 520 may be worn on a finger (e.g., an index finger) of the user. The user may perform a posture 1020 in a state in which the first wearable device 510 and the second wearable device 520 are worn. The posture 1020 may include the posture changed according to movement of the wrist in a posture 1010. The posture 1020 may include the posture in which a hand is moved (or rotated) according to a direction 1011 in the posture 1010. For example, the posture 1010 may correspond to a posture 900 illustrated in FIG. 9.

In the posture 1020, a vector ($\vec{N_w}$), a vector ($\vec{G_w}$), and a vector ($\vec{X_w}$) of the first wearable device 510 may be identified. The vector ($\vec{X_w}$) may be perpendicular to the vector ($\vec{N_w}$). The vector ($\vec{X_w}$) may be parallel to the vector ($\vec{G_w}$). Accordingly, the first rotation angle ($\theta_w$) may be 0 degree (or an angle range corresponding to 0 degree).

In the posture 1010, a vector ($\vec{N_r}$), a vector ($\vec{G_r}$), and a vector ($\vec{X_r}$) of the second wearable device 520 may be identified. The vector ($\vec{X_r}$) may be perpendicular to the vector ($\vec{N_r}$). The vector ($\vec{X_r}$) may be parallel to the vector ($\vec{G_r}$). Accordingly, the second rotation angle ($\theta_r$) may be 0 degree (or an angle range corresponding to 0 degree).

Since the posture 1010 corresponds to the posture 900 illustrated in FIG. 9, in the posture 1010, the difference between the first rotation angle ($\theta_w$) and the second rotation angle ($\theta_r$) may be configured as equation below.

$$|\theta_w - \theta_r| = 0° \qquad \text{[Equation 10]}$$

As a hand of the user moves according to the direction 1011, at least one of the vector ($\vec{N_r}$), the vector ($\vec{G_r}$), and the vector ($\vec{X_r}$) may be changed. For example, as the hand of the user moves (or rotates) according to the direction 1011, the second wearable device 520 may also move (or rotate) according to the direction 1011. Based on movement of the second wearable device 520 according to the direction 1011, the vector ($\vec{N_r}$) may be changed to a vector ($\vec{N'_r}$). Based on movement of the second wearable device 520 according to the direction 1011, the vector ($\vec{G_r}$) and the vector ($\vec{X_r}$) may be maintained. For example, based on movement of the second wearable device 520 according to the direction 1011, a plane formed by the vector ($\vec{N_r}$) and the vector ($\vec{X_r}$) may move. For example, based on movement of the second wearable device 520 according to the direction 1011, an angle between the vector ($\vec{G_r}$) and the vector ($\vec{X_r}$) may be maintained.

The posture 1020, a vector ($\vec{N'_r}$), a vector ($\vec{G_r}$), and a vector ($\vec{X_r}$) of the second wearable device 520 may be identified. The vector ($\vec{X_r}$) may be perpendicular to the vector ($\vec{N'_r}$). The vector ($\vec{X_r}$) may be parallel to the vector ($\vec{G_r}$). Accordingly, the second rotation angle ($\theta_r$) may be 0 degree (or an angle range corresponding to 0 degree).

In the posture 1020, the difference between the first rotation angle ($\theta_w$) and the second rotation angle ($\theta_r$) may be configured as equation below.

$$|\theta_w - \theta_r| = 0° \qquad \text{[Equation 11]}$$

Referring to FIG. 10, a processor 511 may receive, from the second wearable device 520, information on orientation of the second wearable device 520 including the second rotation angle ($\theta_r$). The processor 511 may identify the first rotation angle ($\theta_w$) of the first wearable device 510. The processor 511 may identify the difference between the first rotation angle ($\theta_w$) and the second rotation angle ($\theta_r$) as 0 degree in the posture 1020. Even in the case that the posture of the user changes from the posture 1010 to the posture 1020, the difference between the first rotation angle ($\theta_w$) and the second rotation angle ($\theta_r$) may be identified as 0 degree.

According to an embodiment, the processor 511 of the first wearable device 510 may receive data on the vector ($\vec{N_r}$), data on the vector ($\vec{G_r}$), and data on the vector ($\vec{X_r}$) from the second wearable device 520. The processor 511 may identify the second rotation angle ($\theta_r$) based on data on the vector ($\vec{N_r}$), data on the vector ($\vec{G_r}$), and data on the vector ($\vec{X_r}$). The processor 511 may identify a difference between the identified second rotation angle ($\theta_r$) and the first rotation angle ($\theta_w$) as 0 degree.

Figure 11:
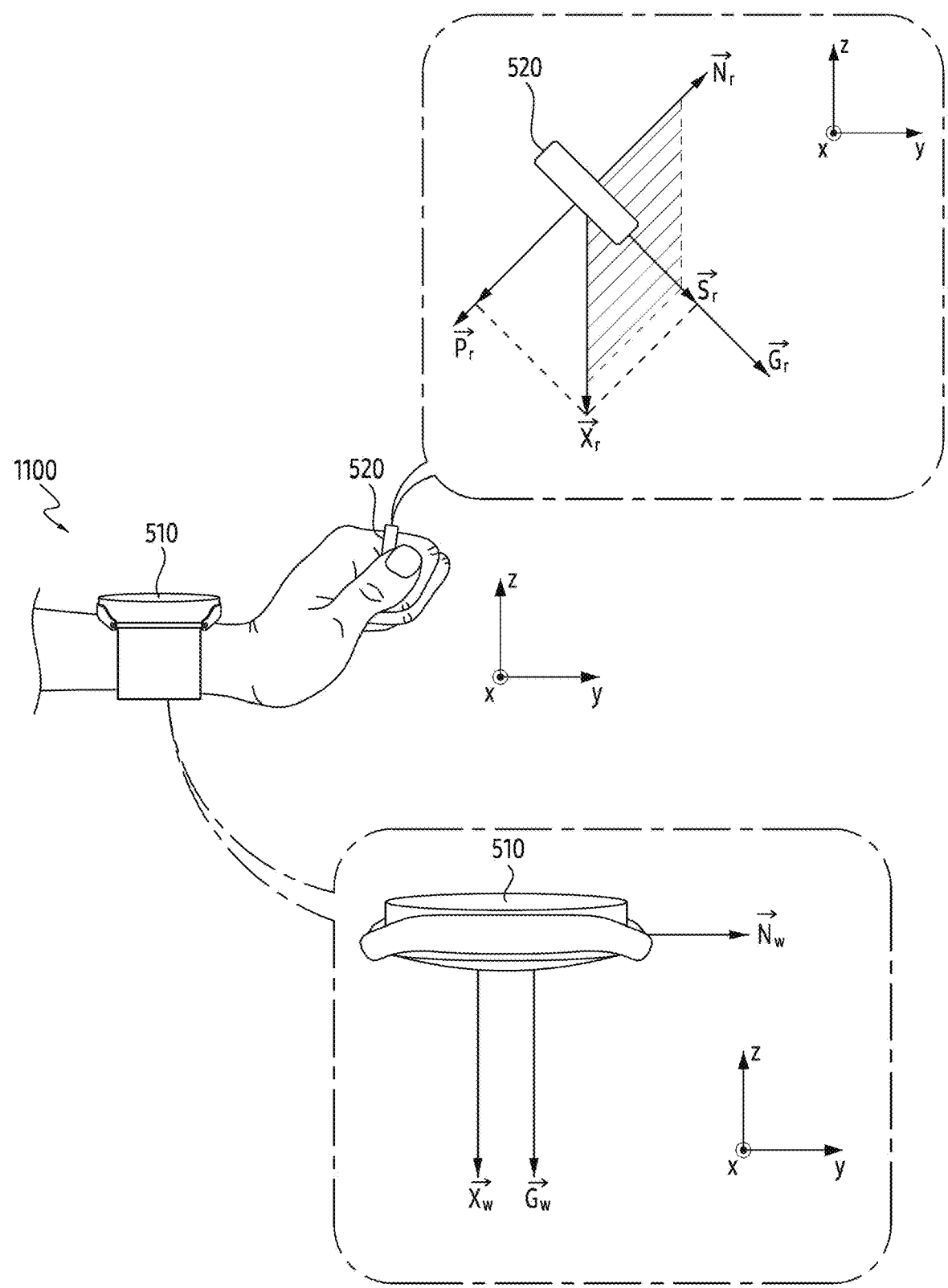
FIG. 11 illustrates an example of a first rotation angle and a second rotation angle according to an embodiment.

FIG. 11 illustrates an example of a first rotation angle and a second rotation angle according to an embodiment.

Referring to 11, a first wearable device 510 may be worn on a wrist of a user. A second wearable device 520 may be worn on a finger (e.g., an index finger) of the user. The user may perform a posture 1100 in a state in which the first wearable device 510 and the second wearable device 520 are worn. The posture 1100 may mean the posture in which a hand of the user is moved upward (e.g., in a z-axis direction). The posture 1100 may mean the posture in which only the finger is moved upward in the state in which the wrist of the user is fixed.

In the posture 1100, a vector ($\vec{N_w}$), a vector ($\vec{G_w}$), and a vector ($\vec{X_w}$) of the first wearable device 510 may be identified. The vector ($\vec{X_w}$) may be perpendicular to the vector ($\vec{N_w}$). The vector ($\vec{X_w}$) may be parallel to the vector ($\vec{G_w}$). Accordingly, the first rotation angle ($\theta_w$) may be 0 degree (or an angle range corresponding to 0 degree).

In the posture 1100, a vector ($\vec{N_r}$), a vector ($\vec{G_r}$), and a vector ($\vec{X_r}$) of the second wearable device 520 may be identified. The vector ($\vec{X_r}$) may be divided into a vector ($\vec{P_r}$) and a vector ($\vec{S_r}$) as, for example, vector components of the vector ($\vec{X_r}$). The vector ($\vec{P_r}$) is a projection vector for the vector ($\vec{N_r}$) of the vector ($\vec{X_r}$). According to Equation 6 described above, the vector ($\vec{P_r}$) may be identified. According to Equation 7 described above, the vector ($\vec{S_r}$) may be identified. The vector ($\vec{S_r}$) may be parallel to the vector ($\vec{G_r}$). Accordingly, the second rotation angle ($\theta_r$) may be 0 degree (or an angle range corresponding to 0 degree).

In the posture 1100, a difference between the first rotation angle ($\theta_w$) and the second rotation angle ($\theta_r$) may be configured as equation below.

$$|\theta_w - \theta_r| = 0° \qquad \text{[Equation 12]}$$

Referring to FIG. 11, a processor 511 may receive, from the second wearable device 520, information on orientation of the second wearable device 520 including the second rotation angle ($\theta_r$). The processor 511 may identify the first rotation angle ($\theta_w$) of the first wearable device 510. The processor 511 may identify the difference between the first rotation angle ($\theta_w$) and the second rotation angle ($\theta_r$) as 0 degree in the posture 1100.

For example, even in the case that the posture of the user changes from a posture 900 illustrated in FIG. 9 to the posture 1100, a plane formed by the vector ($\vec{N_r}$) and the vector ($\vec{X_r}$) may not be changed. Accordingly, an angle between the vector ($\vec{S_r}$) and the vector ($\vec{G_r}$) may be maintained as 0 degree.

According to an embodiment, the processor 511 of the first wearable device 510 may receive data on the vector ($\vec{N_r}$) data on the vector ($\vec{G_r}$), and data on the vector ($\vec{X_r}$) from the second wearable device 520. The processor 511 may identify the second rotation angle ($\theta_r$) data on the vector ($\vec{N_r}$), data on the vector ($\vec{G_r}$), data on the vector ($\vec{X_r}$). The processor 511 may identify a difference between the identified second rotation angle ($\theta_r$) and the first rotation angle ($\theta_w$) as 0 degree.

Figure 12:
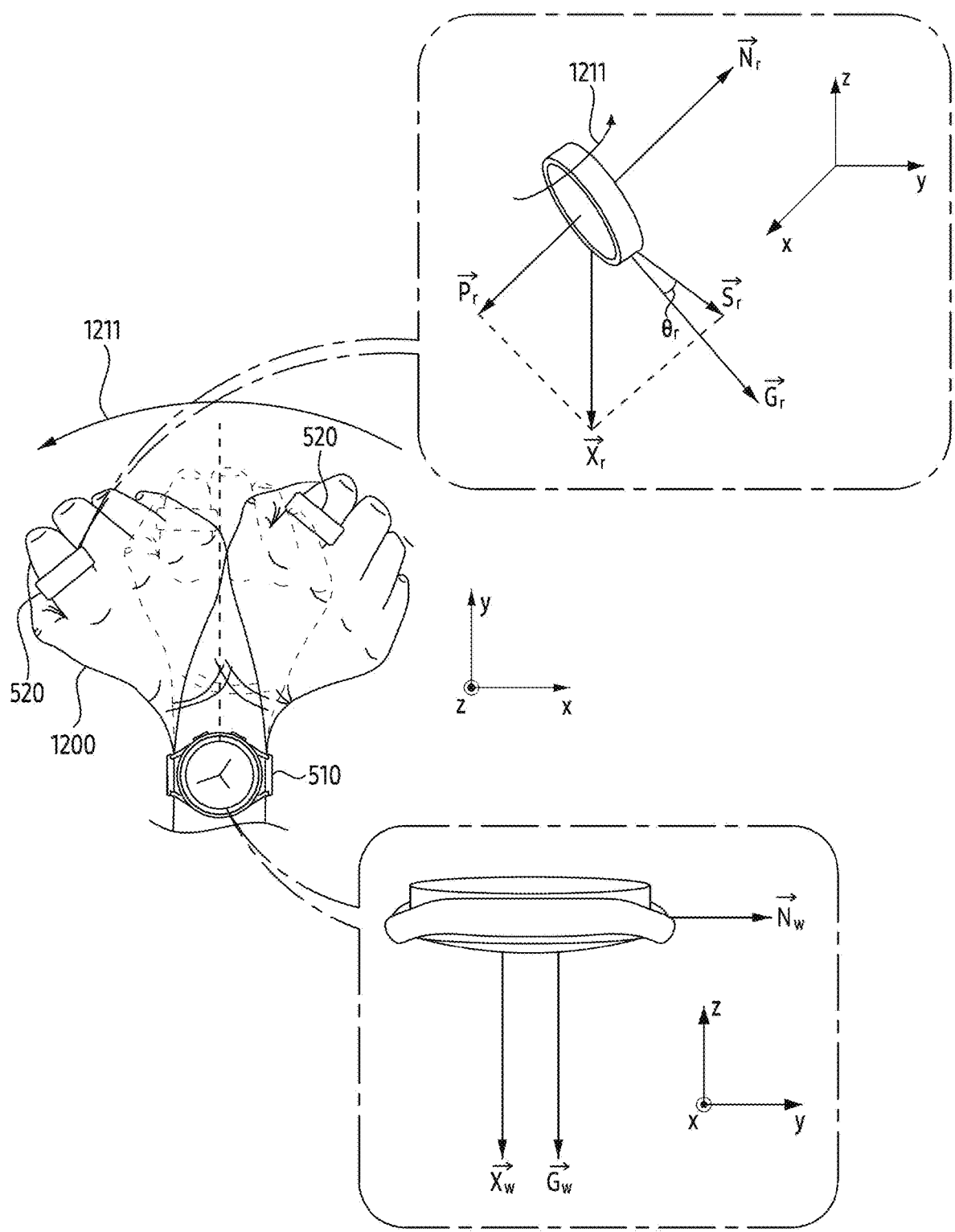
FIG. 12 illustrates an example of a first rotation angle and a second rotation angle according to an embodiment.

FIG. 12 illustrates an example of a first rotation angle and a second rotation angle according to an embodiment.

Referring to FIG. 12, a first wearable device 510 may be worn on a wrist of a user. A second wearable device 520 may be worn on a finger (e.g., an index finger) of the user. The user may perform a posture 1200 in a state in which the first wearable device 510 and the second wearable device 520 are worn. The posture 1200 may mean the posture in which a hand of the user is moved upward (e.g., in a z-axis direction) as illustrated in FIG. 11 and the hand of the user is moved (or rotated) according to a direction 1211. The posture 1200 may mean the posture in which only the finger is moved upward in the state in which the wrist of the user is fixed and the hand of the user is moved (or rotated) according to the direction 1211.

In the posture 1200, a vector ($\vec{N_w}$), a vector ($\vec{G_w}$), and a vector ($\vec{X_w}$) of the first wearable device 510 may be identified. The vector ($\vec{X_w}$) may be perpendicular to the vector ($\vec{N_w}$). The vector ($\vec{X_w}$) may be parallel to the vector ($\vec{G_w}$). Accordingly, the first rotation angle ($\theta_w$) may be 0 degree (or an angle range corresponding to 0 degree).

In the posture 1200, a vector ($\vec{N_r}$), a vector ($\vec{G_r}$), and a vector ($\vec{X_r}$) of the second wearable device 520 may be identified. The vector ($\vec{X_r}$) may be divided into a vector ($\vec{P_r}$) and a vector ($\vec{S_r}$). The vector ($\vec{P_r}$) is a projection vector for the vector ($\vec{N_r}$) of the vector ($\vec{X_r}$). According to Equation 6 described above, the vector ($\vec{P_r}$) may be identified. According to Equation 7 described above, the vector ($\vec{S_r}$) may be identified. The second rotation angle ($\theta_r$) between the vector ($\vec{S_r}$) and the vector ($\vec{G_r}$) may be identified.

In the posture 1200, a difference between the first rotation angle ($\theta_w$) and the second rotation angle ($\theta_r$) may be configured as equation below.

$$|\theta_w - \theta_r| = \beta° \qquad \text{[Equation 13]}$$

Referring to FIG. 12, a processor 511 may receive, from the second wearable device 520, information on orientation of the second wearable device 520 including the second rotation angle ($\theta_r$). The processor 511 may identify the first rotation angle ($\theta_w$) of the first wearable device 510. The processor 511 may identify the difference between the first rotation angle ($\theta_w$) and the second rotation angle ($\theta_r$) as β (beta) degree in the posture 1200. For example, β (beta) degree may be identified as 90 degrees or less according to a wrist motion range of the user (or person).

According to an embodiment, the processor 511 of the first wearable device 510 may receive data on the vector ($\vec{N_r}$), data on the vector ($\vec{G_r}$), and data on the vector ($\vec{X_r}$) from the second wearable device 520. The processor 511 may identify the second rotation angle ($\theta_r$) based on data on the vector ($\vec{N_r}$), data on the vector ($\vec{G_r}$), and data on the vector ($\vec{X_r}$).

Figure 13:
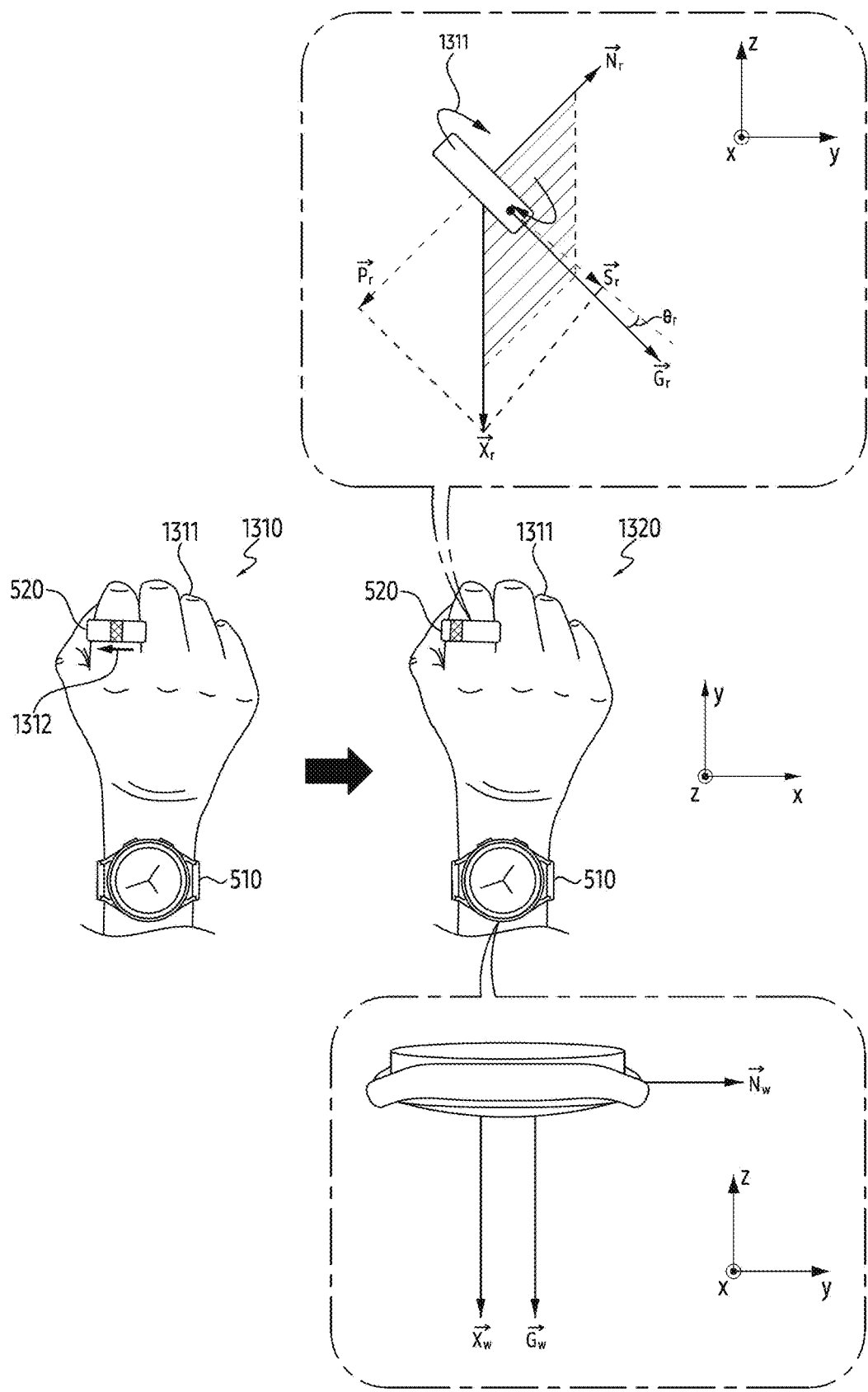
FIG. 13 illustrates an example of a first rotation angle and a second rotation angle according to an embodiment.

FIG. 13 illustrates an example of a first rotation angle and a second rotation angle according to an embodiment.

Referring to FIG. 13, a first wearable device 510 may be worn on a wrist of a user. A second wearable device 520 may be worn on a finger (e.g., an index finger) of the user. The user may perform a posture 1311 in a state in which the first wearable device 510 and the second wearable device 520 are worn. The posture 1311 may correspond to a posture 1100 illustrated in FIG. 11. While the posture of the user is maintained in the posture 1311, the posture (or a position, a direction) of the second wearable device 520 may be changed. The posture of the second wearable device 520 may be changed from a posture 1310 to a posture 1320. Based on the rotation of the second wearable device 520 in the direction 1312 in a state in which the second wearable device 520 is worn on the finger of the user, the posture of the second wearable device 520 may be changed from the posture 1310 to the posture 1320.

While the posture of the second wearable device 520 is the posture 1320, a vector ($\vec{N_w}$), a vector ($\vec{G_w}$), and a vector ($\vec{X_w}$) of the first wearable device 510 may be identified. The vector ($\vec{X_w}$) may be perpendicular to the vector ($\vec{N_w}$). The vector ($\vec{X_w}$) may be parallel to the vector ($\vec{G_w}$). Accordingly, the first rotation angle ($\theta_w$) may be 0 degree (or an angle range corresponding to 0 degree).

While the posture of the second wearable device 520 is the posture 1320, a vector ($\vec{N_r}$), a vector ($\vec{G_r}$), and a vector ($\vec{X_r}$) of the second wearable device 520 may be identified. The vector ($\vec{X_r}$) may be divided into a vector ($\vec{P_r}$) and a vector ($\vec{S_r}$). The vector ($\vec{P_r}$) is a projection vector for the vector ($\vec{N_r}$) of the vector ($\vec{X_r}$). According to Equation 6 described above, the vector ($\vec{P_r}$) may be identified. According to Equation 7 described above, the vector ($\vec{S_r}$) may be identified. The second rotation angle ($\theta_r$) between the vector ($\vec{S_r}$) and the vector ($\vec{G_r}$) may be identified.

While the posture of the second wearable device 520 is the posture 1320, a difference between the first rotation angle ($\theta_w$) and the second rotation angle ($\theta_r$) may be configured as equation below.

$$|\theta_w - \theta_r| = \alpha° \qquad \text{[Equation 14]}$$

Referring to FIG. 13, a processor 511 may receive, from the second wearable device 520, information on orientation of the second wearable device 520 including the second rotation angle ($\theta_r$). The processor 511 may identify the first rotation angle ($\theta_w$) of the first wearable device 510. The processor 511 may identify the difference between the first rotation angle ($\theta_w$) and the second rotation angle ($\theta_r$) as α (alpha) degree in the posture 1320. For example, as the second wearable device 520 rotates on the finger of the user, a (alpha) degree may be identified as 180 degrees or less.

According to an embodiment, the processor 511 of the first wearable device 510 may receive data on the vector ($\vec{N'_r}$), data on the vector ($\vec{G_r}$), and data on the vector ($\vec{X_r}$) from the second wearable device 520. The processor 511 may identify the second rotation angle ($\theta_r$) based on data on the vector ($\vec{N'_r}$), data on the vector ($\vec{G_r}$), and data on the vector ($\vec{X_r}$).

Referring to FIGS. 12 and 13, the first rotation angle ($\theta_w$) and a second rotation angle ($\theta_r$) may be identified, based on the posture of the user being the posture 1200 or the posture of the second wearable device 520 being the posture 1320. For example, since a range of motion of the wrist of the user (or person) is limited, the difference between the first rotation angle ($\theta_w$) and the second rotation angle ($\theta_r$) may be within a designated range while the posture of the user is the posture 1200. The difference between the first rotation angle ($\theta_w$) and the second rotation angle ($\theta_r$) identified while the posture of the second wearable device 520 is the posture 1320 may be outside the designated range. Accordingly, based on the difference between the first rotation angle ($\theta_w$) and the second rotation angle ($\theta_r$) of the second wearable device 520 being outside the designated range, the processor 511 (or processor 521) may identify that the second wearable device 520 has rotated in a state of being worn on the finger of the user. For example, the processor 511 (or processor 521) can determined that the second wearable device 520 has been rotated on the finger of the user, based on the difference between the first rotation angle ($\theta_w$) and the second rotation angle ($\theta_r$) of the second wearable device 520 being outside the designated range.

For example, the designated range may be configured as in the following equation.

$$-\gamma° < \theta_w - \theta_r < \delta° \qquad \text{[Equation 15]}$$

Referring to Equation 15, the designated range may be changed based on the user. For example, based on a designated model (e.g., an artificial intelligence model) indicated by a plurality of parameters, the designated range may be identified. As an example, the processor 511 may train the designated model with (using) the first rotation angle ($\theta_w$) and the second rotation angle ($\theta_r$) identified, based on the wearing history of the first wearable device 510 and the second wearable device 520. The processor 511 may identify the designated range, based on an output value of the (trained) designated model. The designated model can be trained on training data having numerous (pairs of) values for the first rotation angle ($\theta_w$) and the second rotation angle ($\theta_r$) identified in order for algorithms to be trained when the difference between the first rotation angle ($\theta_w$) of the first wearable device 510 and the second rotation angle ($\theta_r$) of the second wearable device 520 are outside the designated range and within the designated range. As an example, the designated range may be identified, based on accuracy of biometric information. The processor 511 (or the processor 521 of the second wearable device 520) may identify the designated range, based on accuracy of data (or biometric information) obtained through a sensor 523 of the second wearable device 520.

For example, in Equation 15, γ (gamma) and δ (delta) may be configured as in the following equation.

$$\gamma = \delta = 90°$$ [Equation 16]

According to an embodiment, the processor 511 may identify that the second wearable device 520 is worn in an abnormal wearing state, based on the difference between the first rotation angle ($\theta_w$) and the second rotation angle ($\theta_r$) being outside the designated range. For example, based on the difference between the first rotation angle ($\theta_w$) and the second rotation angle ($\theta_r$) being outside the designated range, the processor 511 may identify that the second wearable device 520 is worn in a rotated state. In the case that the second wearable device 520 is worn in the rotated state, the position of the sensor 523 for obtaining data on a body of the user may operate in a changed state. In the case that the second wearable device 520 is worn in the rotated state, inaccurate data may be obtained. Accordingly, the processor 511 may provide a notification to guide the user to wear the second wearable device 520 in the normal wearing state. For example, the second wearable device 520 may include affordance (e.g., a groove, an electrode, a display, or an indicator) to guide the normal wearing state outside the second wearable device 520. The processor 511 may provide the notification to guide how to wear the second wearable device 520 through the affordance. As an example, the notification provided from the first wearable device 510 may include at least one of a screen including a user interface, a sound (e.g., voice), and/or vibration. The user may dispose (or arrange) the second wearable device 520 to operate in the normal wearing state through affordance. In response to the user rotating the second wearable device 520 to the normal wearing state, the processor 511 can notify the user that the second wearable device 520 has reached the normal wearing state, where the notification provided from the first wearable device 510 may include at least one of a screen including a user interface, a sound (e.g., voice), and/or vibration.

A specific example of the notification provided from the first wearable device 510 will be described later in FIG. 14.

Figure 14:
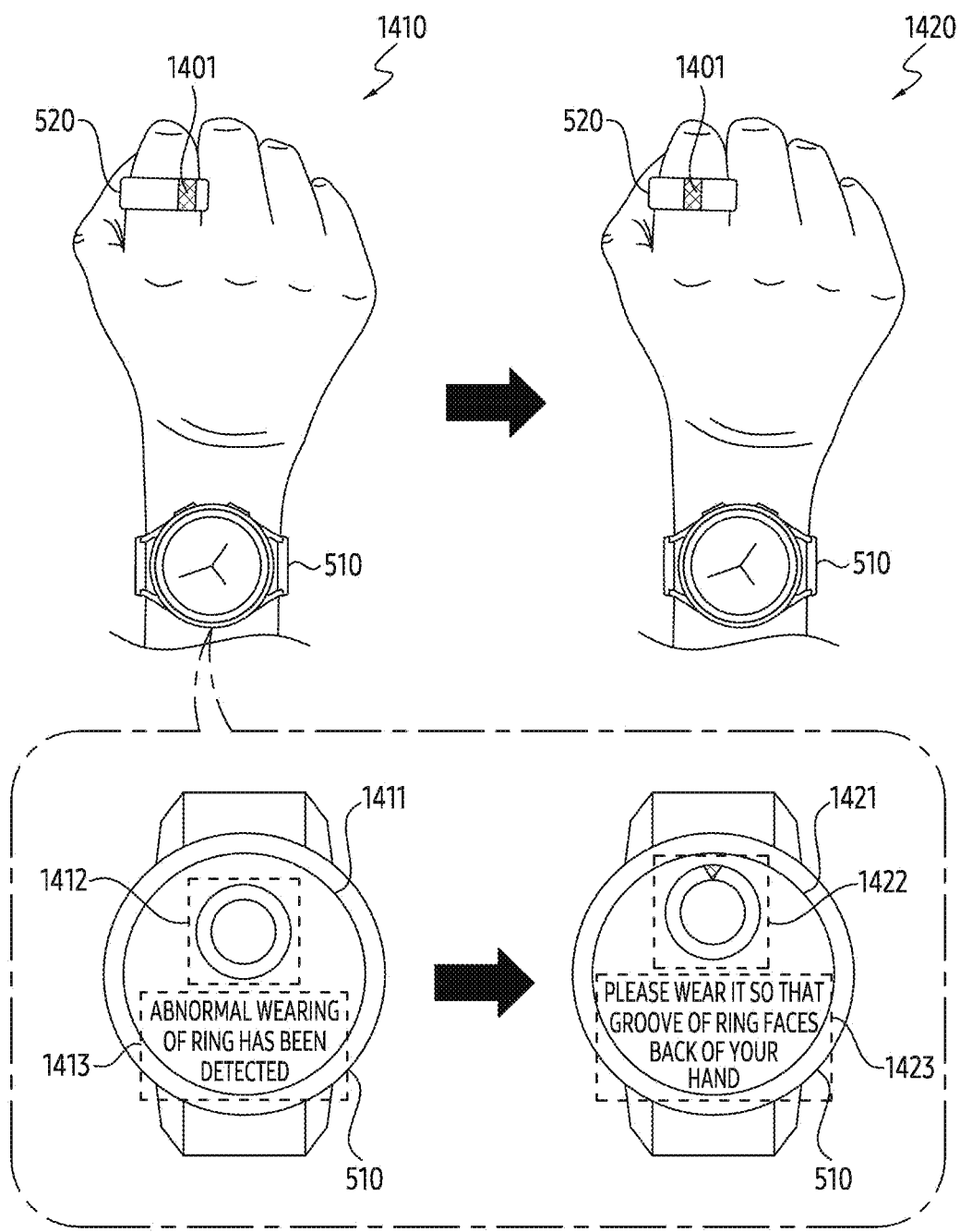
FIG. 14 illustrates an example of a notification to guide changing a position or a direction of a second wearable device according to an embodiment.

FIG. 14 illustrates an example of a notification to guide changing a position or a direction of a second wearable device according to an embodiment.

Referring to FIG. 14, in a state 1410, the second wearable device 520 may be in a state of being worn on a second part (e.g., a finger) of a body of a user. For example, the second wearable device 520 may be worn in an abnormal wearing state. The second wearable device 520 may be in a state of being rotated on the second part of the body of the user. Affordance 1401 on a housing of the second wearable device 520 may not be positioned in a direction in which the back of a hand faces, may not be positioned substantially center with the direction in which the back of the hand faces, etc.

The processor 511 of the first wearable device 510 may identify a difference between a first rotation angle of the first wearable device 510 and a second rotation angle of the second wearable device 520. The processor 511 may identify that the difference between the first rotation angle and the second rotation angle is outside a designated range (e.g., 0 degree to 90 degree).

According to an embodiment, the processor 511 may, based on identifying that the difference between the first rotation angle and the second rotation angle is outside the designated range (e.g., 0 degree to 90 degree), provide the notification to guide changing at least one of the position or the direction of the second wearable device 520.

For example, the processor 511 may display a screen 1411 through a display 515, based on identifying that the difference between the first rotation angle and the second rotation angle is outside the designated range (e.g., 0 degree to 90 degree). The processor 511 may display the screen 1411 including the user interface to guide changing at least one of the position or the direction of the second wearable device 520, based on identifying that the difference between the first rotation angle and the second rotation angle is outside the designated range (e.g., 0 degree to 90 degree).

For example, the screen 1411 may include a visual object 1412 representing a shape of the second wearable device 520 and text 1413 representing that the abnormal wearing of the second wearable device 520 is identified.

The processor 511 may display a screen 1421 after the screen 1411 is displayed. For example, the screen 1421 may be displayed based on the lapse of a designated time after the screen 1411 is displayed. Based on the lapse of the designated time after the screen 1411 is displayed, the processor 511 may change the screen displayed through the display 515 from the screen 1411 to the screen 1421. For example, the screen 1421 may be displayed based on an input to the screen 1411. The processor 511 may display the screen 1421, based on identifying the identified input (e.g., a touch input, an input to a button of the first wearable device 510) while the screen 1411 is being displayed. The processor 511 may display the screen 1421, based on detecting a change in the difference between the first rotation angle and the second rotation angle, but the difference between the first rotation angle and the second rotation angle still remains outside the designated range (e.g., 0 degree to 90 degree).

For example, the screen 1421 may include the visual object 1422 representing the shape and affordance of the second wearable device 520 and text 1423 to guide changing the position or the direction of the second wearable device 520. The visual object 1422 may be displayed to guide affordance of the second wearable device 520 to face the designated direction.

In state 1420, the processor 511 may identify that the second wearable device 520 is worn in a normal wearing state. Affordance 1401 on the housing of the second wearable device 520 may be positioned in the direction in which the back of the hand faces. For example, the processor 511 may identify that difference between the first rotation angle and the second rotation angle is within the designated range (e.g., 0 degree to 90 degree).

Figure 15:
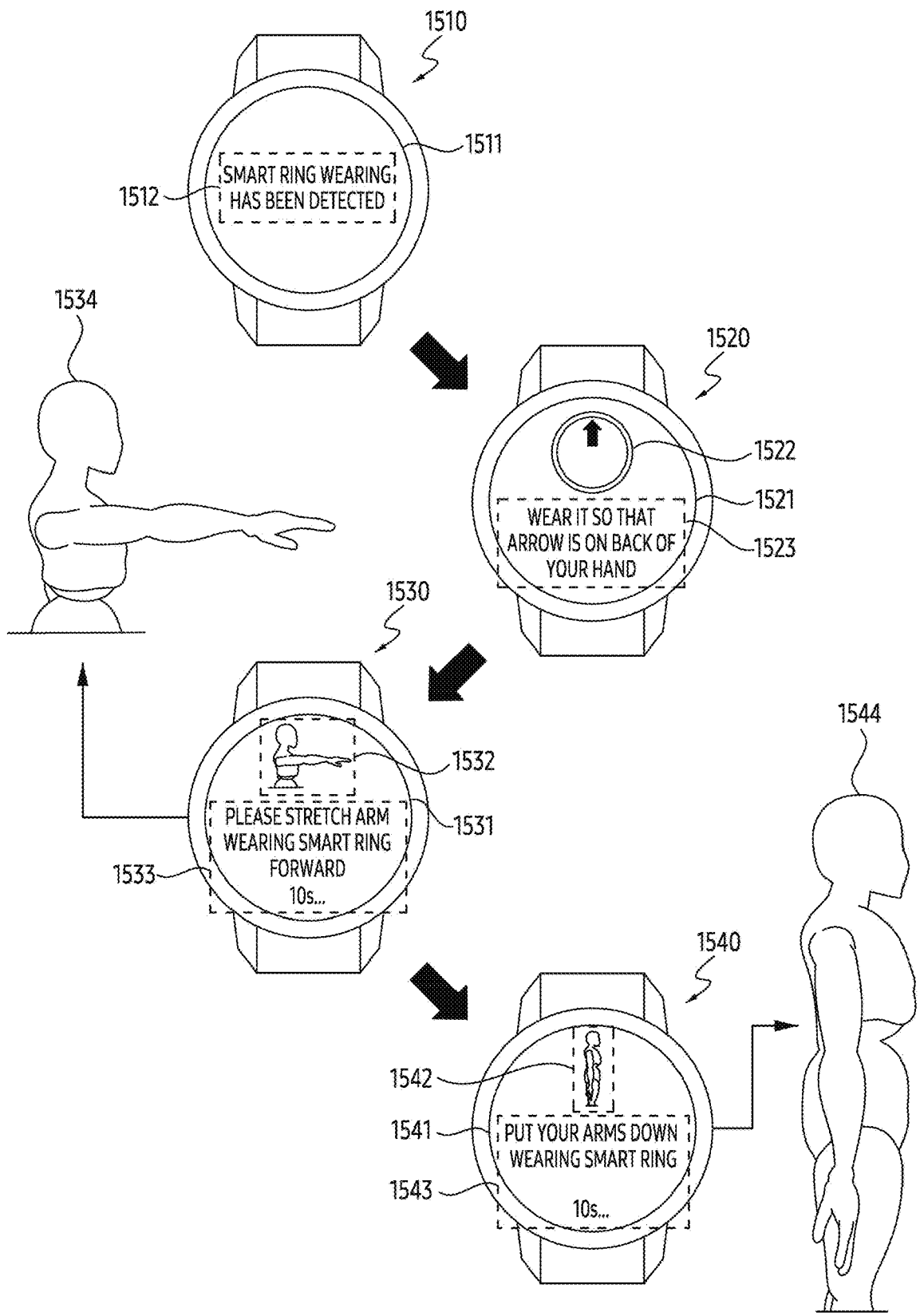
FIG. 15 illustrates an example of a synchronization procedure according to an embodiment.

FIG. 15 illustrates an example of a synchronization procedure according to an embodiment.

Referring to FIG. 15, a processor 511 (or a processor 521) may synchronize the vector ($\vec{N_w}$) and the vector ($\vec{N_r}$) illustrated in FIGS. 8A and 8B. The processor 511 may configure the vector ($\vec{N_w}$) and the vector ($\vec{N_r}$) to be the same. The processor 511 may synchronize the vector ($\vec{G_w}$) and the vector ($\vec{G_r}$). The processor 511 may configure the vector ($\vec{G_w}$) and the vector ($\vec{G_r}$) to be the same.

A first wearable device 510 and a second wearable device 520 may perform a synchronization process for synchronizing the vector ($\vec{N_w}$) and the vector ($\vec{N_r}$), and for synchronizing the vector ($\vec{G_w}$) and the vector ($\vec{G_r}$).

In state 1510, the processor 511 may identify that the second wearable device 520 is worn. For example, the processor 511 may identify that the second wearable device 520 is worn on a second part of a body of a user. The processor 511 may display a screen 1511, based on identifying that the second wearable device 520 is worn. The screen 1511 may include text 1512 representing that wearing of the second wearable device 520 is detected.

In state 1520, the processor 511 may identify that a correction process (or synchronization process) should be performed. Processor 511 may identify that the correction process is required to identify a first rotation angle and a second rotation angle. For example, the processor 511 may identify that the correction process should be performed again, based on the lapse of designated time after the correction process is performed. For example, the processor 511 may identify that the correction process is required, based on identifying that the second wearable device 520 is worn for the first time.

According to an embodiment, the processor 511 may display a screen 1521. The screen 1521 may include a visual object 1522 representing a wearing direction (or a normal wearing state) of the second wearable device 520 and text 1523 to guide the wearing direction. In one or more embodiments, the visual object 1522 may represent the wearing direction (or a normal wearing state) of the affordance 1401 (in FIG. 14) on the housing of the second wearable device 520 positioned in a direction in which the back of the hand faces. Although the affordance 1401 may be illustrated in a direction in which the back of hand faces, it should be noted that this is for explanation purposes and ease of understanding. The affordance 1401 can be designed in another direction for the normal wearing state according to one or more embodiments.

In state 1530, the processor 511 may display a screen 1531 to guide a posture of the user, based on identifying that the second wearable device 520 is worn in a designated position and direction. For example, the screen 1531 may include a visual object 1532 representing a posture 1534 that the user should perform and text 1533 representing the posture that the user should perform and maintenance time of the posture.

For example, the processor 511 may guide the user to maintain a posture 1534 for a designated time. As an example, the processor 511 may guide the user to maintain the posture 1534 for the designated time through sound and/or vibration. According to an embodiment, the posture 1534 may include a state in which a palm of a hand is attached to the desk from the elbow in the state in which the first wearable device 510 and the second wearable device 520 are worn.

During the posture 1534, the vector ($\vec{G_w}$) and the vector ($\vec{G_r}$) illustrated in FIGS. 8A and 8B may be configured in the same (or a similar) direction. During the posture 1534, the vector ($\vec{G_w}$) and the vector ($\vec{G_r}$) may be maintained in the direction of gravity. While the posture 1534 is maintained, the processor 511 may synchronize the vector ($\vec{G_w}$) with the vector ($\vec{G_r}$).

In state 1540, the processor 511 may display a screen 1541 to guide the posture of the user, based on identifying that the posture 1534 is maintained for the designated time. The processor 511 may display the screen 1541 to guide the posture of the user, based on identifying that the vector ($\vec{G_w}$) and the vector ($\vec{G_r}$) are synchronized.

For example, the screen 1541 may include a visual object 1542 representing a posture 1544 that the user should perform and text 1533 representing the posture that the user should perform and maintenance time of the posture.

For example, the processor 511 may guide the user to maintain the posture 1544 for a designated time. As an example, the processor 511 may guide the user to maintain the posture 1544 for designated time through sound and/or vibration.

During the posture 1544, the vector ($\vec{N_w}$) and the vector ($\vec{N_r}$) may be configured in the same (or a similar) direction. During the posture 1544, the vector ($\vec{N_w}$) and the vector ($\vec{N_r}$) may be maintained in the direction of gravity. While the posture 1544 is maintained, the processor 511 may synchronize the vector ($\vec{N_w}$) with the vector ($\vec{N_r}$).

Figure 16:
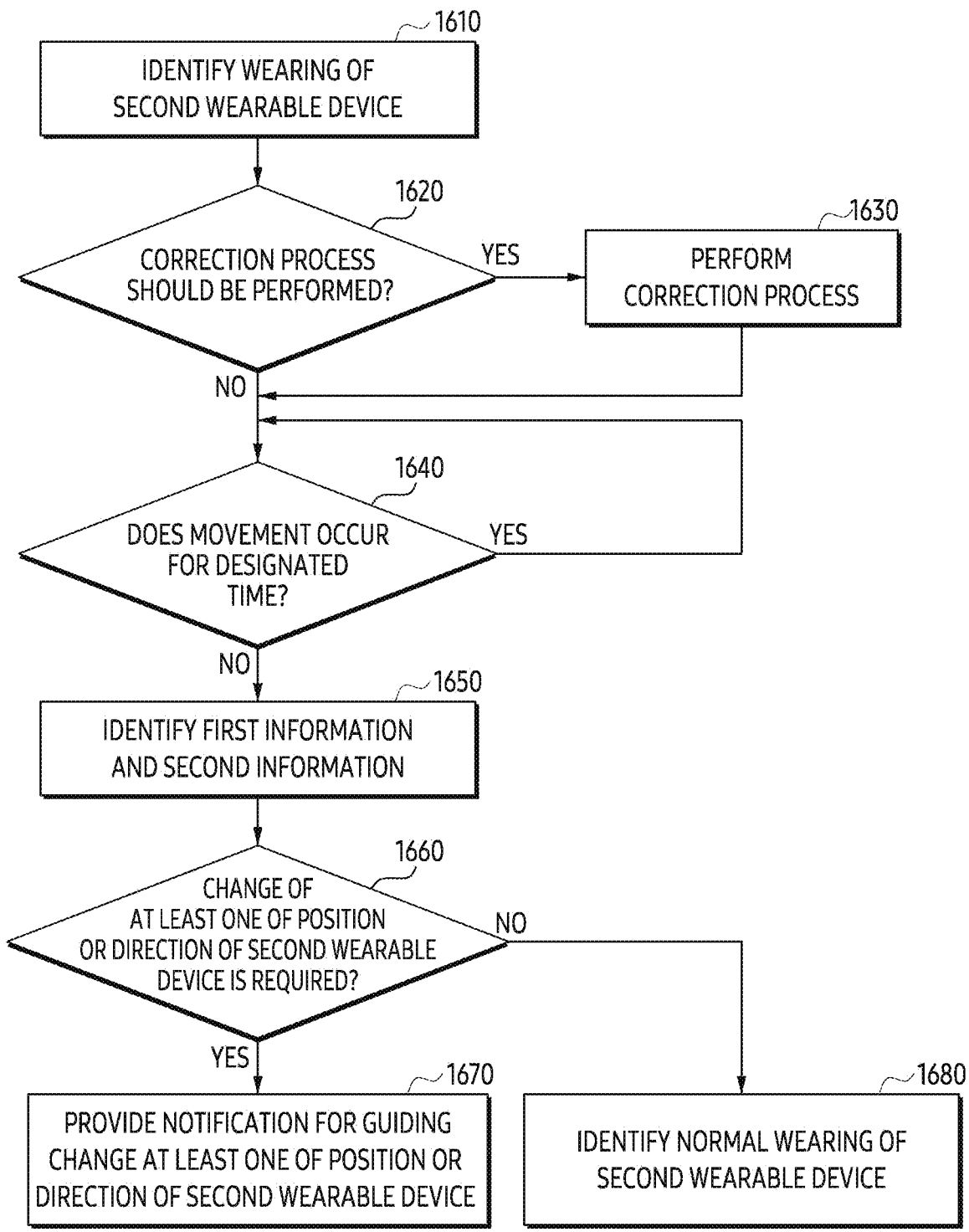
FIG. 16 illustrates a flowchart on an operation of a first wearable device according to an embodiment.

FIG. 16 illustrates a flowchart on an operation of a first wearable device according to an embodiment.

In the following embodiment, each of operations may be performed sequentially, but is not necessarily performed sequentially. For example, an order of each of operations may be changed, and at least two operations may be performed in parallel.

In an operation 1610, the processor 511 may identify wearing of a second wearable device 520. The processor 511 may establish a connection with the second wearable device 520. The processor 511 may identify that the second wearable device 520 is worn on a second part of a body of a user, based on data obtained through the sensor 523 of the second wearable device 520.

In an operation 1620, the processor 511 may identify whether a correction process should be performed. For example, the processor 511 may identify whether the correction process should be performed, based on identifying wearing of the second wearable device 520. For example, the correction process may correspond to the process illustrated in FIG. 15.

In an operation 1630, the processor 511 may perform the correction process. For example, in the case that the correction process needs to be performed, the processor 511 may perform the correction process. For example, the processor 511 may perform the correction process, based on identifying that the correction process should be performed.

For example, the processor 511 may identify that the correction process is required to identify a first rotation angle and a second rotation angle. For example, the processor 511 may identify that the correction process should be performed again, based on the lapse of designated time after the correction process is performed. For example, the processor 511 may identify that the correction process is required, based on identifying that the second wearable device 520 is worn for the first time.

In an operation 1640, the processor 511 may identify whether movement occurs for designated time. For example, in the case that the correction process does not need to be performed, the processor 511 may identify whether movement occurs for the designated time. For example, in the case that the correction process is performed, the processor

511 may identify whether movement occurs for the designated time such as whether there has been a (predefined) lapse in time since last performing the correction process.

The processor 511 may identify whether movement of the user does not occur for designated time to identify whether the second wearable device 520 has rotated on the second part of the body of the user. For example, in the case that movement occurs for designated time, the processor 511 may perform the operation 1640 again.

According to an embodiment, the processor 511 may identify whether movement of the user does not occur for designated time, based on monitoring movements of the first wearable device 510 and the second wearable device 520.

In an operation 1650, the processor 511 may identify first information and second information. For example, in the case that no movement occurs for designated time, the processor 511 may identify (or obtain) first information on orientation of the first wearable device 510. The processor 511 may identify (or receive) second information on orientation of the second wearable device 520.

For example, first information may include the first rotation angle of the first wearable device 510 according to a designated axis. Second information may include the second rotation angle of the second wearable device 520 according to the designated axis.

In operation 1660, the processor 511 may identify whether a change of at least one of a position or a direction of the second wearable device 200 is required. For example, the processor 511 may identify whether a change of at least one of the position or the direction of the second wearable device 200 is required, based on the first information and the second information. Based on whether a difference between the first rotation angle and the second rotation angle is outside a designated range, the processor 511 may identify whether a change of at least one of the position or the direction of the second wearable device 200 is required.

In an operation 1670, the processor 511 may provide a notification to guide changing at least one of the position or the direction of the second wearable device 520. For example, in the case that it is necessary to change at least one of the position or the direction of the second wearable device, the processor 511 may provide a notification to guide changing at least one of the position or the direction of the second wearable device 520, based on displaying the screen 1411 and/or the screen 1412 illustrated in FIG. 14 through a display 515.

In operation 1680, the processor 511 may identify normal wearing of the second wearable device 520. For example, the processor 511 may identify that the second wearable device 520 is worn in a normal wearing state, based on identifying that at least one change of the position or the direction of the second wearable device 520 is not required.

Figure 17A:
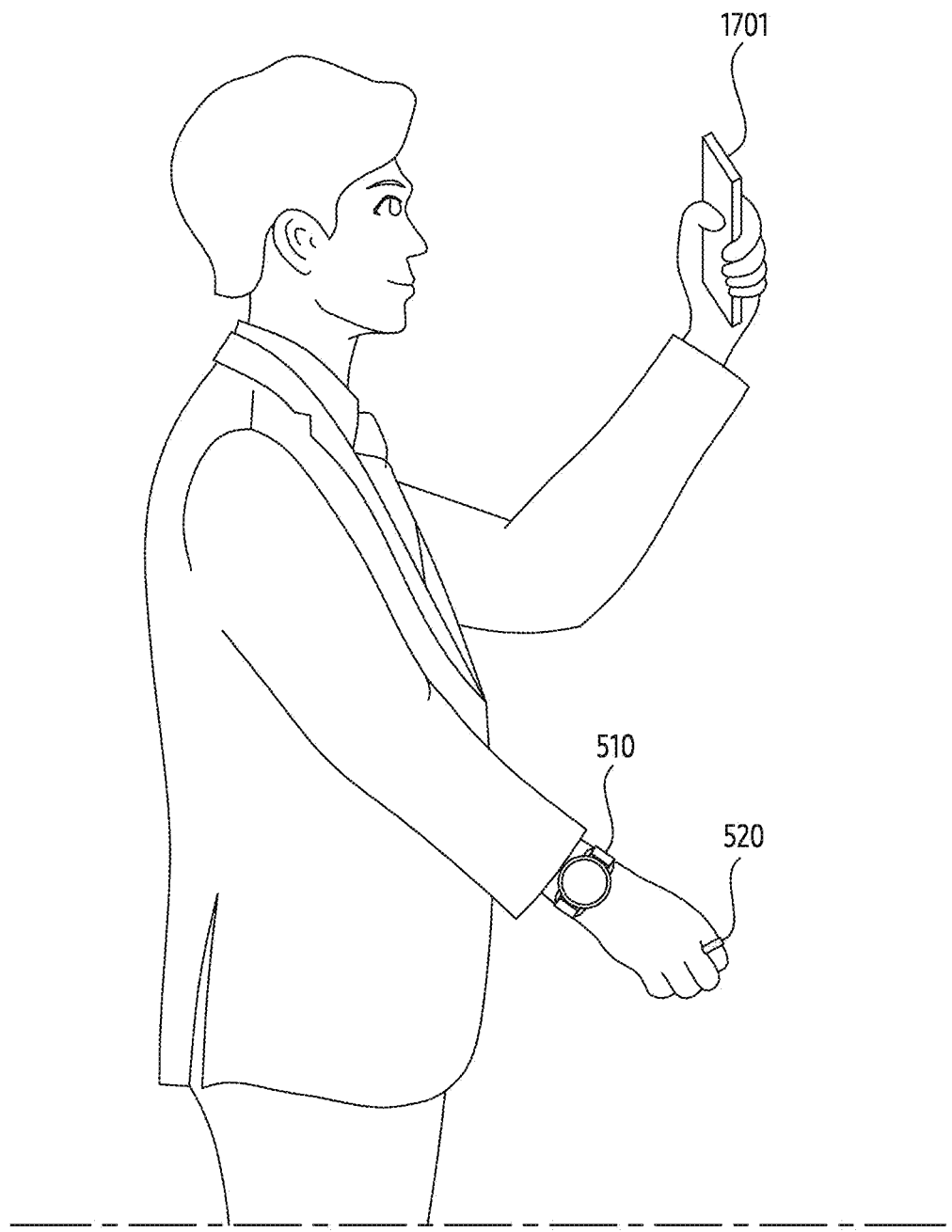
FIG. 17A illustrates an example of an environment including a first wearable device, a second wearable device, and an electronic device according to an embodiment.

FIG. 17A illustrates an example of an environment including a first wearable device, a second wearable device, and an electronic device according to an embodiment.

Figure 17B:
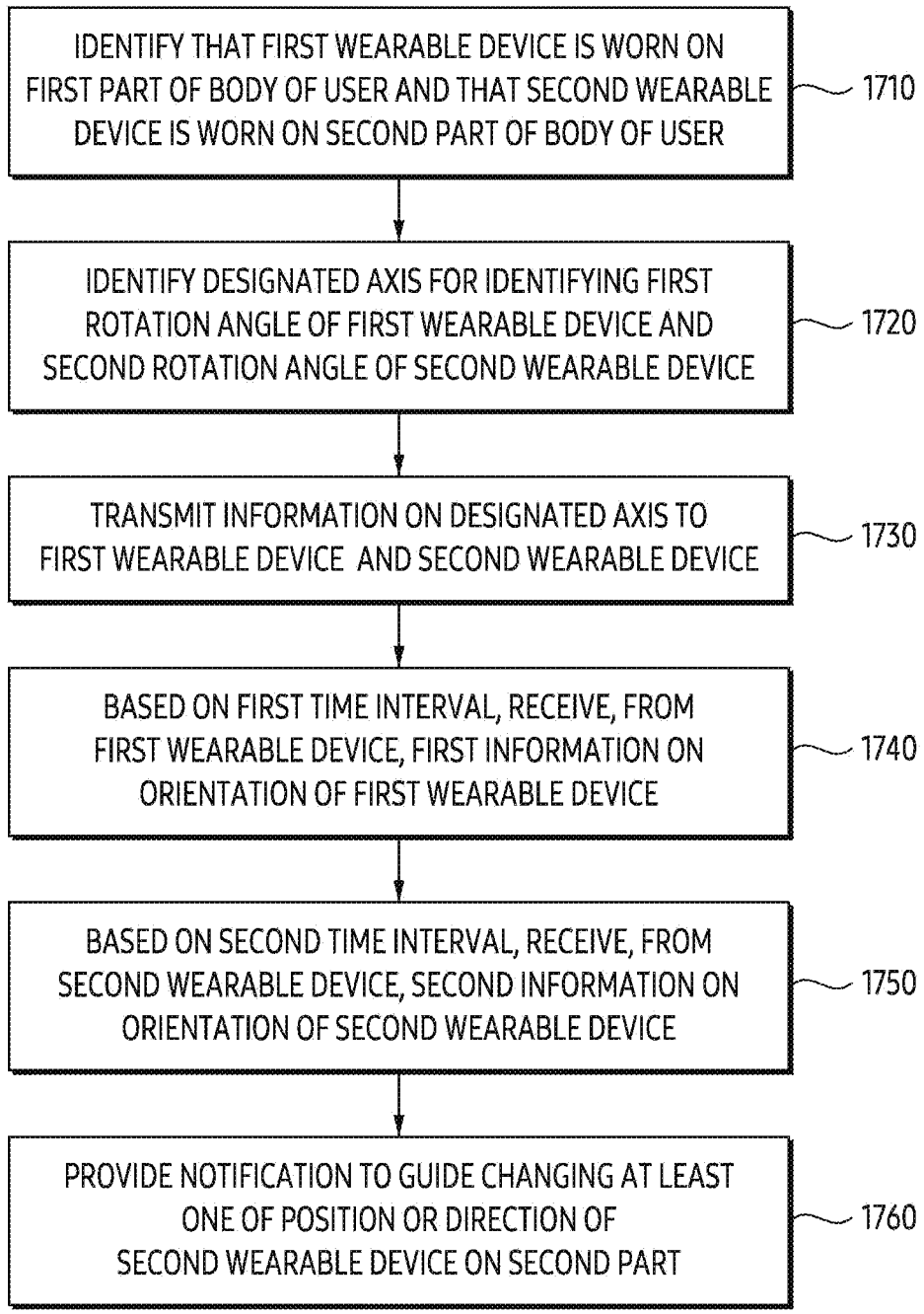
FIG. 17B illustrates a flowchart on an operation of an electronic device according to an embodiment.

FIG. 17B illustrates a flowchart of an operation of an electronic device according to an embodiment.

Referring to 17A, an electronic device 1701 may be connected to a first wearable device 510 and a second wearable device 520. The electronic device 1701 may control the first wearable device 510 and the second wearable device 520. For example, the electronic device 1701 (or the processor of the electronic device 1701) may identify that the second wearable device 520 operates in the abnormal wearing state by using information obtained from the first wearable device 510 and information obtained from the second wearable device 520. The electronic device 1701 may provide the notification to guide changing at least one of the position or the direction of the second wearable device 520 so that the second wearable device 520 operates in the normal wearing state. For example, the notification may be provided by the electronic device 1701 or may be provided by the first wearable device 510. The operation of the electronic device 1701 for providing the notification will be described in operations 1710 to 1760 of FIG. 17B.

In the following embodiment, each of operations may be performed sequentially, but is not necessarily performed sequentially. For example, an order of each of operations may be changed, and at least two operations may be performed in parallel.

Referring to FIG. 17B, in an operation 1710, the electronic device 1701 may identify that the first wearable device 510 is worn on a first part of a body of a user and that the second wearable device 520 is worn on a second part of a body of a user. For example, the electronic device 1701 may identify that the first wearable device 510 is worn on the first part of the body of the user, based on data obtained through a sensor 513 of the first wearable device 510. The electronic device 1701 may identify that the second wearable device 520 is worn on the second part of the body of the user, based on data obtained through the sensor 523 of the second wearable device 520.

In an operation 1720, the electronic device 1701 may identify a designated axis for identifying a first rotation angle of the first wearable device 510 and a second rotation angle of the second wearable device 520. For example, the electronic device 1701 may synchronize a first axis identified by an acceleration sensor 513-1 of the first wearable device 510 and a second axis identified by an acceleration sensor 523-1 of the second wearable device 520. The electronic device 1701 may identify the designated axis, based on synchronizing the first axis and the second axis.

In an operation 1730, the processor 511 may transmit information on the designated axis to the first wearable device 510 and the second wearable device 520. The first wearable device 510 may identify (or monitor) the first rotation angle of the first wearable device 510, based on information on the designated axis. The second wearable device 520 may identify (or monitor) the second rotation angle of the second wearable device 520, based on information on the designated axis.

In an operation 1740, the electronic device 1701 may, based on a first time interval, receive, from the first wearable device 510, first information on orientation of the first wearable device 510. For example, first information on orientation of the first wearable device 510 may include the first rotation angle of the first wearable device 510 according to the designated axis and a first timing that the first rotation angle is identified. For example, the electronic device 1701 may receive first information on orientation of the first wearable device 510 from the first wearable device 510, based on a period configured based on a first time interval.

In an operation 1750, the electronic device 1701 may, based on a second time interval, receive, from the second wearable device 520, second information on orientation of the second wearable device 520. For example, second information on orientation of the second wearable device 520 may include the second rotation angle of the second wearable device 520 according to the designated axis and a second timing that the second rotation angle is identified. For example, the electronic device 1701 may receive second information on orientation of the second wearable device 520 from the second wearable device 520, based on a period configured based on a second time interval.

According to an embodiment, the first time interval and the second time interval may be configured to be the same. The electronic device 1701 may receive first information from the first wearable device 510 and receive second information from the second wearable device 520, based on a designated time interval. According to an embodiment, the first time interval and the second time interval may be configured differently.

In operation 1760, the electronic device 1701 may provide the notification to guide changing at least one of the position or the direction of the second wearable device 520 on the second part of the body of the user. For example, based on first information and second information, the electronic device 1701 may identify that the first timing corresponds to the second timing. Based on identifying that the first timing corresponds to the second timing, the electronic device 1701 may identify that a difference between the first rotation angle and the second rotation angle. Based on identifying that the difference between the first rotation angle and the second rotation angle is outside a designated range, the electronic device 1701 may provide the notification to guide changing at least one of the position or the direction of the second wearable device 520 on the second part. For example, the electronic device 1701 may display a screen 1411 and/or at least one screen corresponding to the screen 1421 illustrated in FIG. 14 by using the display on the electronic device 1701. For example, the electronic device 1701 may transmit a signal for controlling the first wearable device 510 to display a screen for guiding the first wearable device 510 to change at least one of the position or the direction of the second wearable device 520. Based on the signal received from the electronic device 1701, the first wearable device 510 may provide the notification to guide changing at least one of the position or the direction of the second wearable device 520 on the second part.

According to an embodiment, a first wearable device may include at least one sensor, a communication circuitry, a processor comprising processing circuitry, and memory comprising instructions, comprising storage medium. The instructions, when executed by the processor, may cause the first wearable device to obtain, using the at least one sensor, first information on orientation of the first wearable device worn on a first part of a body of a user. The instructions, when executed by the processor, may cause the first wearable device to receive, from a second wearable device communicably coupled to the first wearable device and worn on a second part of the body of the user, second information on orientation of the second wearable device. Based on the first information and the second information, the instructions, when executed by the processor, may cause the first wearable device to provide a notification to guide changing a position, a direction, or both the position and the direction of the second wearable device on the second part.

According to an embodiment, the first information may include a first rotation angle of the first wearable device according to a designated axis. The second information may include a second rotation angle of the second wearable device according to the designated axis.

According to an embodiment, the instructions, when executed by the processor, may cause the first wearable device to, based on identifying that a difference between the first rotation angle and the second rotation angle is outside a designated range, provide the notification to guide changing the position, the direction, or both the position and the direction of the second wearable device on the second part.

According to an embodiment, the instructions, when executed by the processor, may cause the first wearable device to, based on identifying that a difference between the first rotation angle and the second rotation angle is within the designated range, identify movement of the second wearable device with respect to the first wearable device.

According to an embodiment, the first wearable device may be configured in a shape of a watch. The second wearable device is configured in a shape of a ring.

According to an embodiment, the designated axis may be configured to correspond to a direction perpendicular to a plane corresponding to a hole of the second wearable device.

According to an embodiment, the instructions, when executed by the processor, may cause the first wearable device to, based on identifying that a value for movement of the first wearable device and a value for movement of the second wearable device are within a designated movement range during a designated time interval, obtain the first information and the second information.

According to an embodiment, the instructions, when executed by the processor, may cause the first wearable device to in response to identifying that the second wearable device is worn on the second part of the body of the user, provide another notification to guide the user to maintain a posture of the user in a first posture. The instructions, when executed by the processor, may cause the first wearable device to, based on the another notification for guiding maintaining the first posture, provide a further notification for guiding the user to maintain the posture of the user in the second posture changed from the first posture.

According to an embodiment, the instructions, when executed by the processor, may cause the first wearable device to, while the posture of the user is maintained in the first posture, identify a direction of gravity. The instructions, when executed by the processor, may cause the first wearable device to identify a direction of the designated axis to identify a first rotation angle of the first wearable device on the first part while the posture of the user is maintained in the second posture.

According to an embodiment, the instructions, when executed by the processor, may cause the first wearable device to, while a posture of the user is maintained in the first posture, transmit a first signal to the second wearable device to request the second wearable device to identify the direction of the gravity. The instructions, when executed by the processor, may cause the first wearable device to, while the posture of the user is maintained in the second posture, transmit a second signal to the second wearable device to request to identify the direction of the designated axis for identifying the second rotation angle of the second wearable device on the second part.

According to an embodiment, a method of a first wearable device may include obtaining, using at least one sensor of the first wearable device, first information on orientation of the first wearable device worn on a first part of a body of a user. The method may include receiving, from a second wearable device communicably coupled to the first wearable device and worn on a second part of the body of the user, second information on orientation of the second wearable device. The method may include based on the first information and the second information, providing a notification to guide changing a position, a direction, or both the position and the direction of the second wearable device on the second part.

According to an embodiment, the first information may include a first rotation angle of the first wearable device according to a designated axis. The second information may include a second rotation angle of the second wearable device according to the designated axis.

According to an embodiment, the method may include, based on identifying that a difference between the first rotation angle and the second rotation angle is outside a designated range, providing the notification to guide changing the position, the direction, or both the position and the direction of the second wearable device on the second part.

According to an embodiment, the method may include, based on identifying that the difference between the first rotation angle and the second rotation angle is within the designated range, identifying movement of the second wearable device with respect to the first wearable device.

According to an embodiment, the first wearable device may be configured in a shape of a watch. The second wearable device may be configured in a shape of a ring.

According to an embodiment, the designated axis may be configured to correspond to a direction perpendicular to a plane corresponding to a hole of the second wearable device.

According to an embodiment, the method may include, based on identifying that a value for movement of the first wearable device and a value for movement of the second wearable device are within a designated movement range during a designated time interval, obtaining the first information and the second information.

According to an embodiment, the method may include, in response to identifying that the second wearable device is worn on the second part of the body of the user, providing another notification to guide the user to maintain a posture of the user in a first posture. The method may include, based on the another notification for guiding maintaining the first posture, providing a further notification for guiding the user to maintain the posture of the user in the second posture changed from the first posture.

According to an embodiment, the method may include, while the posture of the user is maintained in the first posture, identifying a direction of gravity. The method may include identifying a direction of the designated axis to identify the first rotation angle of the first wearable device on the first part while the posture of the user is maintained in the second posture.

According to an embodiment, the method may include, while the posture of the user is maintained in the first posture, transmitting a first signal to the second wearable device to request the second wearable device to identify the direction of the gravity. The method may further include, while the posture of the user is maintained in the second posture, transmitting a second signal to the second wearable device to request to identify the direction of the designated axis for identifying a second rotation angle of the second wearable device on the second part.

According to an embodiment, non-transitory computer readable storage medium may store one or more programs. The one or more programs may include instructions which, when being executed by a processor of a first wearable device with at least one sensor and a communication circuitry, cause the first wearable device to obtain, using the at least one sensor, first information on orientation of the first wearable device worn on a first part of a body of a user. The one or more programs may include instructions which, when being executed by the processor, cause the first wearable device to receive, from a second wearable device communicably coupled to the first wearable device and worn on a second part of the body of the user, second information on orientation of the second wearable device. The one or more programs may include instructions which, when being executed by a processor, based on the first information and the second information, cause the first wearable device to provide a notification to guide changing at least one of a position, a direction, or both the position and the direction of the second wearable device on the second part.

According to an embodiment, an electronic device may include a processor comprising processing circuitry, and memory comprising instructions, comprising storage medium. The instructions, when executed by the processor, may cause the electronic device to identify that the first wearable device is worn on a first part of a body of a user and that the second wearable device is worn on a second part of the body of the user. The instructions, when executed by the processor, may cause the electronic device to, based on the identification, identify a designated axis for identifying a first rotation angle of the first wearable device and a second rotation angle of the second wearable device. The instructions, when executed by the processor, may cause the electronic device to transmit information on the designated axis to the first wearable device and the second wearable device.

According to an embodiment, the instructions, when executed by the processor, may cause the electronic device to, based on a first time interval, receive, from the first wearable device, first information on orientation of the first wearable device. The instructions, when executed by the processor, may cause the electronic device to, based on a second time interval, receive, from the second wearable device, second information on orientation of the second wearable device. The instructions, when executed by the processor, may cause the electronic device to, based on the first information and the second information, provide a notification to guide changing at least one of a position or a direction of the second wearable device on the second part.

According to an embodiment, the first information may include the first rotation angle of the first wearable device according to the designated axis and a first timing that the first rotation angle is identified. The second information may include the second rotation angle of the second wearable device according to the designated axis and a second timing that the second rotation angle is identified.

According to an embodiment, the instructions, when executed by the processor, may cause the electronic device to, based on identifying that the first timing corresponds to the second timing, identify that a difference between the first rotation angle and the second rotation angle. the instructions, when executed by the processor, may cause the electronic device to, based on identifying that the difference between the first rotation angle and the second rotation angle is outside a designated range, provide the notification to guide changing at least one of the position or the direction of the second wearable device on the second part.

According to the above-described embodiment, the second wearable device may have a circular shape. However, the position of components included in the second wearable device may be in a fixed state. Accordingly, the position of a specific component may vary according to the way of wearing the second wearable device. For example, data may be obtained with the highest accuracy when an optical unit included in the second wearable device is on the lower surface of a finger (e.g., in the direction of a palm). Accordingly, in order to detect the position or the direction of the second wearable device, the first rotation angle of the first wearable device and the second rotation angle of the second wearable device may be identified. Since the first wearable device operates in a state of being fixed to the wrist, a difference between the first rotation angle and the second rotation angle may mean an angle at which the second wearable device rotates in the finger. The first wearable device may identify the angle at which the second wearable device rotates in the finger, based on the difference between the first rotation angle and the second rotation angle.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. A first wearable device comprising:
   at least one sensor;
   communication circuitry;
   at least one processor comprising processing circuitry; and
   memory, comprising storage medium storing instructions, wherein the instructions, when executed by the at least one processor, cause the first wearable device to:
   obtain, using the at least one sensor, first orientation data of the first wearable device, identified relative to a reference axis, the first wearable device being worn on a first part of a body of a user,
   receive, through the communication circuitry, from a second wearable device, second orientation data of the second wearable device, identified relative to the reference axis, the second wearable device being worn on a second part of the body,
   identify difference data between the first orientation data comprising a first rotation angle of the first wearable device relative to the reference axis and second orientation data comprising a second rotation angle of the second wearable device relative to the reference axis, and
   based on identifying that a difference between the first rotation angle and the second rotation angle is outside a designated range, provide a notification for guiding to adjust a wearing posture of the second wearable device worn on the second part of the body.

2. The first wearable device of the claim 1, wherein the instructions when executed by the processor cause the first wearable device to, based on identifying that a difference between the first rotation angle and the second rotation angle is within the designated range, identify movement of the second wearable device with respect to the first wearable device.

3. The first wearable device of claim 1, wherein the first wearable device is configured in a shape of a watch, and
wherein the second wearable device is configured in a shape of a ring.

4. The first wearable device of the claim 3, wherein the reference axis is configured to correspond to a direction perpendicular to a plane corresponding to a hole of the second wearable device.

5. The first wearable device of claim 1, wherein the instructions when executed by the processor cause the first wearable device to, based on identifying that a value for movement of the first wearable device and a value for movement of the second wearable device are within a designated movement range during a designated time interval, obtain the first orientation data and the second orientation data.

6. The first wearable device of claim 1, wherein the instructions when executed by the processor cause the first wearable device to:
in response to identifying that the second wearable device is worn on the second part of the body of the user, provide another notification to guide the user to maintain a posture of the user in a first posture, and
based on the another notification for guiding maintaining the first posture, provide a further notification for guiding the user to maintain the posture of the user in a second posture changed from the first posture.

7. The first wearable device of claim 6, wherein the instructions when executed by the processor cause the first wearable device to:
while the posture of the user is maintained in the first posture, identify a direction of gravity, and
identify a direction of the reference axis to identify the first orientation data of the first wearable device on the first part while the posture of the user is maintained in the second posture.

8. The first wearable device of claim 7, wherein the instructions when executed by the processor cause the first wearable device to:
while the posture of the user is maintained in the first posture, transmit a first signal to the second wearable device to request the second wearable device to identify the direction of the gravity, and
while the posture of the user is maintained in the second posture, transmit a second signal to the second wearable device to request to identify the direction of the reference axis for identifying the second orientation data of the second wearable device on the second part.

9. A method of a first wearable device comprising:
obtaining, using at least one sensor of the first wearable device, first orientation data of the first wearable device identified relative to a reference axis, the first wearable device being worn on a first part of a body of a user,
receiving, through a communication circuitry of the first wearable device, from a second wearable device, second orientation data of the second wearable device, identified relative to the reference axis, the second wearable device being worn on a second part of the body,
identifying difference data between the first orientation data comprising a first rotation angle of the first wearable device relative to the reference axis and second orientation data comprising a second rotation angle of the second wearable device relative to the reference axis, and
based on identifying that a difference between the first rotation angle and the second rotation angle is outside a designated range, providing a notification for guiding to adjust a wearing posture of the second wearable device worn on the second part of the body.

10. The method of claim 9, further comprising, based on identifying that the difference between the first rotation angle and the second rotation angle is within the designated range, identifying movement of the second wearable device with respect to the first wearable device.

11. The method of claim 9, wherein the first wearable device is configured in a shape of a watch, and
wherein the second wearable device is configured in a shape of a ring.

12. The method of claim 11, wherein the reference axis corresponds to a direction perpendicular to a plane corresponding to a hole of the second wearable device.

13. The method of claim 9, further comprising, based on identifying that a value for movement of the first wearable device and a value for movement of the second wearable device are within a designated movement range during a designated time interval, obtaining the first orientation data and the second orientation data.

14. The method of claim 9, further comprising:
in response to identifying that the second wearable device is worn on the second part of the body of the user, providing another notification to guide the user to maintain a posture of the user in a first posture, and
based on the another notification for guiding maintaining the first posture, providing a further notification for guiding the user to maintain the posture of the user in a second posture changed from the first posture.

15. The method of claim 14, further comprising:
while the posture of the user is maintained in the first posture, identifying a direction of gravity, and
identifying a direction of the reference axis to identify the first orientation data of the first wearable device on the first part while the posture of the user is maintained in the second posture.

16. A non-transitory computer readable storage medium storing one or more programs, wherein the one or more programs comprise instructions which, when executed by at least one processor of a first wearable device with at least one sensor and communication circuitry, cause the first wearable device to:
obtain, using the at least one sensor, first orientation data of the first wearable device, identified relative to a reference axis, the first wearable device being worn on a first part of a body of a user,
receive, through the communication circuitry, from a second wearable device, second orientation data of the second wearable device, identified relative to the reference axis, the second wearable device being worn on a second part of the body,
identify difference data between the first orientation data comprising a first rotation angle of the first wearable device relative to the reference axis and second orientation data comprising a second rotation angle of the second wearable device relative to the reference axis, and based on identifying that a difference between the first rotation angle and the second rotation angle is outside a designated range, provide a notification for guiding to adjust a wearing posture of the second wearable device worn on the second part of the body.

* * * * *